(12) United States Patent
Wang et al.

(10) Patent No.: US 12,431,600 B2
(45) Date of Patent: Sep. 30, 2025

(54) ELECTRODE ASSEMBLY, BATTERY CELL, BATTERY, AND ELECTRICAL DEVICE

(71) Applicant: Contemporary Amperex Technology (Hong Kong) Limited, Hong Kong (CN)

(72) Inventors: Manman Wang, Ningde (CN); Yiheng Wang, Ningde (CN); Xiaoming Ge, Ningde (CN); Zhengfang Zhang, Ningde (CN); Yulei Fan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/053,817

(22) Filed: Feb. 14, 2025

(65) Prior Publication Data

US 2025/0219271 A1    Jul. 3, 2025

Related U.S. Application Data

(63) Continuation of application No. PCT/CN2022/126724, filed on Oct. 21, 2022.

(51) Int. Cl.
*H01M 50/586* (2021.01)
*H01M 4/80* (2006.01)
(Continued)

(52) U.S. Cl.
CPC ........... *H01M 50/586* (2021.01); *H01M 4/80* (2013.01); *H01M 10/0431* (2013.01);
(Continued)

(58) Field of Classification Search
CPC .................................................. H01M 50/586
See application file for complete search history.

(56) References Cited

U.S. PATENT DOCUMENTS

2018/0366786 A1* 12/2018 Fujii ..................... H01M 4/13
2019/0020037 A1* 1/2019 Guo .................... H01M 4/0428
(Continued)

FOREIGN PATENT DOCUMENTS

CN    208045607 U    11/2018
CN    114597476 A    11/2021
(Continued)

OTHER PUBLICATIONS

International Search Report for International Application PCT/CN2022/126724 mailed Jun. 23, 2023.
(Continued)

*Primary Examiner* — Brian R Ohara
(74) *Attorney, Agent, or Firm* — Ladas & Parry LLP

(57) ABSTRACT

An electrode assembly, a battery cell, a battery, and an electrical device are described. The battery cell includes a negative electrode plate and a positive electrode plate. The negative electrode plate includes a porous current collector and a first tab connected to at least one end of the porous current collector. The positive electrode plate includes a body portion and a second tab connected to at least one end of the body portion. The body portion and the porous current collector are stacked along a thickness direction of the porous current collector. Along a first direction, neither end of the porous current collector extends beyond the body portion. The first direction is perpendicular to the thickness direction of the porous current collector.

19 Claims, 10 Drawing Sheets

(51) Int. Cl.
*H01M 10/04* (2006.01)
*H01M 50/533* (2021.01)
*H01M 50/536* (2021.01)
*H01M 50/595* (2021.01)

(52) U.S. Cl.
CPC ....... *H01M 50/533* (2021.01); *H01M 50/536* (2021.01); *H01M 50/595* (2021.01)

(56) References Cited

U.S. PATENT DOCUMENTS

| | | | |
|---|---|---|---|
| 2021/0296744 A1 | 9/2021 | Taniuchi et al. | |
| 2022/0328940 A1* | 10/2022 | Park | H01M 50/538 |
| 2022/0416306 A1* | 12/2022 | Tikhonov | H01M 10/0585 |

FOREIGN PATENT DOCUMENTS

| | | |
|---|---|---|
| CN | 214588915 U | 11/2021 |
| CN | 216120663 U | 3/2022 |
| JP | 2013045795 A | 6/2022 |

OTHER PUBLICATIONS

Written Opinion for International Application PCT/CN2022/126724 mailed Jun. 23, 2023.
Chinese Notification to Grant for copending application 202222788097.X mailed Jan. 20, 2023.

\* cited by examiner

ELECTRODE ASSEMBLY, BATTERY CELL, BATTERY, AND ELECTRICAL DEVICE

CROSS-REFERENCE TO RELATED APPLICATIONS

This application is a continuation of International application PCT/CN2022/126724 filed on Oct. 21, 2022, the subject matter of which is incorporated herein in its entirety.

TECHNICAL FIELD

This application relates to the technical field of batteries, and in particular, to an electrode assembly, a battery cell, a battery, and an electrical device.

BACKGROUND

In recent years, new energy vehicles have developed by leaps and bounds. In the field of electric vehicles, power batteries play an essential and irreplaceable role as a power source of electric vehicles. With the vigorous promotion of new energy vehicles, the demand for power battery products is growing progressively. As a core component of a new energy vehicle, a battery is expected to meet high requirements in terms of service life, safety, and the like. A battery cell of the battery is prepared by making an electrode assembly (bare cell), putting the electrode assembly into a shell, and then injecting an electrolyte solution into the shell. The electrode assembly is prepared by winding or stacking a positive electrode plate, a negative electrode plate, and a separator or by other means. However, the battery cell in the prior art is very prone to safety hazards such as a short circuit during subsequent use, so that the battery cell is put at high risk during use.

SUMMARY

Some embodiments of this application provide an electrode assembly, a battery cell, a battery, and an electrical device to improve safety of the battery cell effectively.

According to a first aspect, an embodiment of this application provides a battery cell. The battery cell includes a negative electrode plate and a positive electrode plate. The negative electrode plate includes a porous current collector and a first tab connected to at least one end of the porous current collector. The positive electrode plate includes a body portion and a second tab connected to at least one end of the body portion. The body portion and the porous current collector are stacked along a thickness direction of the porous current collector. Along a first direction, neither end of the porous current collector extends beyond the body portion. The first direction is perpendicular to the thickness direction of the porous current collector.

In the above technical solution, a porous current collector and a first tab protrusively disposed at minimally one end of the porous current collector are disposed on the negative electrode plate of the electrode assembly. A body portion and a second tab connected to at least one end of the body portion are disposed on the positive electrode plate of the electrode assembly. The porous current collector of the negative electrode plate and the body portion of the positive electrode plate are stacked together, and neither end of the porous current collector in the first direction is set to extend beyond the body portion of the positive electrode plate. In this way, the entire porous current collector of the negative electrode plate can be covered by the body portion of the positive electrode plate, thereby ensuring that the entire porous current collector of the negative electrode plate is pressed by the body portion. On the one hand, the above arrangement makes the current density uniform during charging of the electrode assembly. On the other hand, a restraining force is also applied to an edge of the porous current collector in the first direction, so as to induce the lithium metal on the porous current collector to deposit uniformly to alleviate a phenomenon of forming dendrites from the lithium metal deposited at the edge of the porous current collector. This can effectively suppress growth of dendrites of the lithium metal, reduce the risk of a short circuit in the electrode assembly, and reduce the phenomena that a large amount of "dead lithium" is deposited on the porous current collector and results in loss of active lithium and capacity fading, thereby enhancing the safety and performance of the electrode assembly in use.

In some embodiments, the body portion includes a substrate and a positive active material layer. The second tab is connected to the substrate. The positive active material layer is disposed on one side of the substrate, where the side is oriented toward the porous current collector in the thickness direction of the porous current collector. Along the first direction, neither end of the porous current collector extends beyond the positive active material layer. An insulation layer is disposed on one side of the positive active material layer, the side is oriented toward the porous current collector, and the insulation layer covers one end of the positive active material layer.

In the technical solution, a substrate and a positive active material layer are disposed on the body portion, and the positive active material layer is disposed on one side of the substrate in the thickness direction of the porous current collector. In this way, the positive active material layer and the porous current collector face each other in the thickness direction of the porous current collector. Neither end of the porous current collector in the first direction is set to extend beyond the positive active material layer, so that the positive active material layer can cover the porous current collector, thereby making the entire porous current collector subjected to a restraining force of the positive active material layer. This structure is simple and easy to manufacture. In addition, the insulation layer is disposed on one side of the positive active material layer, the side being oriented toward the porous current collector. The insulation layer covers one end of the positive active material layer. On the one hand, the electrode assembly of this structure can block lithium ions to some extent through the insulation layer, where the lithium ions are precipitated by a part of the positive active material layer, the part extending beyond the porous current collector. This helps to reduce the phenomena of depositing the lithium ions at the edge of the porous current collector. On the other hand, the insulation layer can obstruct, to some extent, the lithium metal dendrites formed at the edge of the porous current collector in the first direction, thereby alleviating the phenomenon of a short circuit between the negative electrode plate and the positive electrode plate caused by the lithium metal dendrites, and in turn, effectively reducing the safety hazards of the electrode assembly in use.

In some embodiments, the positive active material layer includes a first region and a second region. Along the first direction, the first region is connected to at least one end of the second region. The insulation layer covers the first region. Along the first direction, the second region does not extend beyond the porous current collector.

In the above technical solution, the insulation layer is set to cover the first region of the positive active material layer. The second region is set to extend beyond the porous current collector at neither end in the first direction, so as to make the dimension of an effective region in the first direction less than or equal to the dimension of the porous current collector, where the effective region is a region in which the positive active material layer and the porous current collector face each other. On the one hand, this can alleviate the lithium plating phenomenon of the electrode assembly in use. On the other hand, the insulation layer can play a more effective role in obstructing the lithium metal dendrites formed at the edge of the porous current collector in the first direction.

In some embodiments, two insulation layers are disposed on one side of the positive active material layer, the side being oriented toward the porous current collector. The two insulation layers cover two ends of the positive active material layer respectively.

In the above technical solution, two insulation layers are disposed on one side of the positive active material layer, and the side is oriented toward the porous current collector, so that the two insulation layers can cover the two ends of the positive active material layer in the first direction respectively, thereby blocking the lithium metal precipitated at the two ends of the positive active material layer in the first direction, and obstructing the lithium metal dendrites formed at the two edges of the porous current collector in the first direction, and in turn, further enhancing the safety of the electrode assembly in use.

In some embodiments, along the first direction, the insulation layer extends beyond one end of the positive active material layer.

In the above technical solution, the insulation layer includes an end extending beyond the positive active material layer in the first direction. In other words, in the first direction, the insulation layer includes a part extending beyond one end of the positive active material layer. On the one hand, this enables the insulation layer to more effectively cover one end of the positive active material layer. On the other hand, the insulation layer well protects one end of the positive active material layer in the first direction, and makes it convenient to cut and process the positive electrode plate during manufacturing of the electrode assembly.

In some embodiments, along the thickness direction of the porous current collector, a part of the insulation layer overlaps the porous current collector. A width of the overlap part between the insulation layer and the porous current collector in the first direction is L, satisfying: 1 mm≤L≤3.5 mm.

In the above technical solution, the width of the overlap part between the insulation layer and the porous current collector in the first direction is set to fall within the range of 1 mm to 3.5 mm. On the one hand, the setting alleviates a low effect of the insulation layer in obstructing the lithium metal dendrites and blocking the precipitated lithium ions, where the low effect is caused by a deficient width of the overlap between the insulation layer and the porous current collector. The setting can also alleviate the problem of high difficulty of manufacturing caused by the deficient width of the overlap between the insulation layer and the porous current collector. On the other hand, the setting alleviates the phenomenon of an excessive coverage area of the insulation layer covering the positive active material layer, where the excessive coverage area is caused by an excessive overlap width between the insulation layer and the porous current collector, and results in much loss of capacity of the electrode assembly.

In some embodiments, the insulation layer is connected to the positive active material layer.

In the above technical solution, the insulation layer is connected to the positive active material layer so that the insulation layer can cover one end of the positive active material layer in the first direction. On the one hand, the electrode assembly of such a structure improves the effect of the insulation layer in covering the positive active material layer, and reduces the difficulty of assembling the electrode assembly. On the other hand, the insulation layer can suppress lithium ion precipitation from the covered region of the positive active material layer, thereby reducing the lithium plating risk of the electrode assembly in use, and reducing the phenomenon of lithium ion deposition at the edge of the porous current collector.

In some embodiments, the positive active material layer includes a first region and a second region. Along the first direction, the first region is connected to at least one end of the second region. The insulation layer covers the first region. Along the thickness direction of the porous current collector, a sum of thicknesses of the first region and the insulation layer at a same position is $D_2$, and a thickness of the second region is $D_3$, satisfying: $-80\ \mu m \le D_2 - D_3 \le 10\ \mu m$.

In the above technical solution, in the thickness direction of the porous current collector, the difference between a thickness sum and the thickness of the second region is set to fall within the range of $-80\ \mu m$ to $10\ \mu m$, where the thickness sum is a sum of the thickness of the first region of the positive active material layer and the thickness of the insulation layer at the same position. In other words, the insulation layer protrudes beyond the second region by $0\ \mu m$ to $10\ \mu m$ in the thickness direction of the porous current collector, or the second region protrudes beyond the insulation layer by $0\ \mu m$ to $80\ \mu m$ in the thickness direction of the porous current collector. The electrode assembly of this structure can alleviate the phenomenon of an overlarge clearance between the positive active material layer and the porous current collector. On the one hand, the above setting alleviates the phenomenon of an overly high internal resistance of the electrode assembly caused by the overlarge clearance between the positive active material layer and the porous current collector. On the other hand, the above setting alleviates the lithium plating risk of the electrode assembly caused by the overlarge clearance between the positive active material layer and the porous current collector.

In some embodiments, the positive active material layer includes a first region and a second region. Along the first direction, the first region is connected to at least one end of the second region. The insulation layer covers the first region, and a thickness of the first region is less than a thickness of the second region.

In the above technical solution, the thickness of the first region, coated with the insulation layer, of the positive active material layer is set to be less than the thickness of the second region of the positive active material layer. A thinned region is formed on the positive active material layer, and the insulation layer is disposed in the thinned region of the positive active material layer. The electrode assembly of this structure increases the stability and reliability of the connection of the insulation layer to the positive active material layer, thereby reducing the risk of the insulation layer falling off during use.

In some embodiments, the positive active material layer includes a first region and a second region. Along the first direction, the first region is connected to at least one end of the second region. The insulation layer covers the first region. Along the thickness direction of the porous current collector, a surface, oriented toward the porous current collector, of the first region is flush with a surface, oriented toward the porous current collector, of the second region.

In the above technical solution, the surface oriented toward the porous current collector in the first region, coated with the insulation layer, of the positive active material layer is set to be flush with the surface oriented toward the porous current collector in the second region of the positive active material layer. In other words, of the positive active material layer, the surface oriented toward the porous current collector in the thickness direction of the porous current collector is a flat face, and the insulation layer is connected to the surface, oriented toward the porous current collector, of the positive active material layer, so as to cover the first region of the positive active material layer. This structure makes it convenient to connect the insulation layer to the positive active material layer, reduces the difficulty of processing, and enhances the production efficiency.

In some embodiments, the electrode assembly further includes a separator. The separator is disposed between the negative electrode plate and the positive electrode plate to separate the negative electrode plate from the positive electrode plate. The insulation layer is connected to a surface of the separator, the surface being oriented toward the positive active material layer.

In the above technical solution, a separator is further disposed in the electrode assembly. The separator serves to separate the positive electrode plate from the negative electrode plate to reduce the risk of a short circuit between the positive electrode plate and the negative electrode plate. In addition, the insulation layer is connected to a surface, oriented toward the positive active material layer, of the separator, so that the insulation layer covers one end of the positive active material layer. This structure helps to reduce the difficulty of assembling the insulation layer.

In some embodiments, the body portion includes a substrate and a positive active material layer. The second tab is connected to the substrate. The positive active material layer is disposed on one side of the substrate, where the side is oriented toward the porous current collector in the thickness direction of the porous current collector. Along the first direction, neither end of the positive active material layer extends beyond the porous current collector. Along the first direction, at least one end of the positive active material layer is connected to an insulation layer. The insulation layer extends beyond one end of the porous current collector.

In the above technical solution, neither end of the positive active material layer in the first direction is set to extend beyond the porous current collector. The insulation layer is connected to at least one end of the positive active material layer in the first direction, and the insulation layer extends beyond one end of the porous current collector in the first direction, so that the insulation layer can apply a restraining force to the edge of the porous current collector. The electrode assembly of this structure ensures that the entire porous current collector is pressed by the body portion, and also effectively reduces the lithium plating risk of the electrode assembly in use.

In some embodiments, along the first direction, each of the two ends of the positive active material layer is connected to an insulation layer.

In the above technical solution, each of the two ends of the positive active material layer along the first direction is connected to an insulation layer, so that both insulation layers can extend beyond the two ends of the porous current collector along the first direction respectively, thereby applying a restraining force to both edges of the porous current collector in the first direction, alleviating the phenomenon of forming dendrites from the lithium metal deposited at the edges of the porous current collector, and in turn, effectively suppressing growth of the lithium metal dendrites, reducing the short circuit risk of the electrode assembly, and enhancing the safety and performance of the electrode assembly in use.

In some embodiments, an elastic modulus of the insulation layer is E, satisfying: E≥1 GPa.

In the above technical solution, the elastic modulus of the insulation layer is greater than or equal to 1 GPa, so that the insulation layer is of high strength and toughness. On the one hand, this can effectively reduce the phenomenon of damage to the insulation layer in use, and increase the service life of the electrode assembly. On the other hand, this can well block the lithium metal dendrites, and reduce the phenomena of the insulation layer being pierced by the lithium metal dendrites, thereby effectively reducing the risk of the battery cell in use.

In some embodiments, the insulation layer is an insulation tape or an insulation coating layer.

In the above technical solution, an insulation tape or an insulation coating layer is used as an insulation layer to cover one end of the positive active material layer in the first direction. The insulation layer of this structure can be put into use by just being bonded or applied onto one side of the positive active material layer, and the side is oriented toward the porous current collector, thereby facilitating assembling of the electrode assembly, and improving the production efficiency of the electrode assembly.

In some embodiments, along the first direction, at least one end of the body portion extends beyond the porous current collector.

In the above technical solution, at least one end of the body portion in the first direction is set to extend beyond the porous current collector to ensure that the entire porous current collector is pressed by the body portion. In this way, the porous current collector is well subjected to an expansion restraining force, thereby effectively alleviating the phenomenon of unrestrained growth of the lithium metal dendrites in the porous current collector.

In some embodiments, along the first direction, two ends of the body portion are flush with two ends of the porous current collector.

In the above technical solution, by setting the two ends of the body portion in the first direction to be flush with the two ends of the porous current collector, the electrode assembly of this structure ensures that the entire porous current collector is pressed by the body portion, and also effectively reduces the waste of the positive active material layer, reduces the manufacturing cost of the electrode assembly, and saves the space occupied by the electrode assembly.

In some embodiments, along the thickness direction of the porous current collector, a maximum thickness of the first tab is less than a thickness of the porous current collector.

In the above technical solution, the maximum thickness of the first tab in the thickness direction of the porous current collector is set to be less than the thickness of the porous current collector. On the one hand, this setting makes it convenient to fit and connect the first tab to other components subsequently. On the other hand, during production of the electrode assembly, when neither end of the porous current collector of the negative electrode plate in the first direction is set to extend beyond the body portion of the positive electrode plate, it is convenient to efficiently distinguish the porous current collector from the first tab, thereby improving the manufacturing precision of the electrode assembly.

In some embodiments, the porous current collector and the first tab are a one-piece structure. The first tab is connected to one end of the porous current collector in the first direction. The first tab includes a body section and a transition section. Along the first direction, the transition section is connected between the body section and the porous current collector. A thickness of the transition section in the thickness direction of the porous current collector increases gradually from an end near the body section to an end near the porous current collector.

In the above technical solution, the porous current collector and the first tab are a structure formed in one piece, so that the first tab includes a body section and a transition section connected between the porous current collector and the body section. The thickness of the transition section in the thickness direction of the porous current collector increases gradually from the end near the body section to the end near the porous current collector, thereby making the first tab protrude beyond one end of the porous current collector. The negative electrode plate of this structure can effectively increase the structural strength of the first tab, and effectively increase the connection strength between the first tab and the porous current collector.

In some embodiments, the porous current collector and the first tab are separate structures. The first tab is connected to one side of the porous current collector in the thickness direction of the porous current collector. The first tab protrudes beyond one end of the porous current collector along the first direction.

In the above technical solution, the porous current collector and the first tab are made as separate structures, and the first tab is connected to one side of the porous current collector in the thickness direction of the porous current collector, and then protrudes beyond one end of the porous current collector along the first direction, so that the first tab protrudes beyond one end of the porous current collector. The negative electrode plate of this structure is easy to manufacture, thereby improving the production efficiency of the electrode assembly.

In some embodiments, along the thickness direction of the porous current collector, a thickness of the second tab is less than a thickness of the body portion.

In the above technical solution, the thickness of the second tab in the thickness direction of the porous current collector is set to be less than the thickness of the body portion. On the one hand, this setting makes it convenient to fit and connect the second tab to other components subsequently. On the other hand, during production of the electrode assembly, when neither end of the porous current collector of the negative electrode plate in the first direction is set to extend beyond the body portion of the positive electrode plate, it is convenient to efficiently distinguish the body portion from the second tab, thereby improving the manufacturing precision of the electrode assembly.

In some embodiments, the electrode assembly is a jelly-roll electrode assembly. The first direction is identical to a direction of a winding axis of the electrode assembly.

In the above technical solution, the electrode assembly is made to be a jelly-roll structure, and the first direction is identical to the direction of the winding axis of the electrode assembly. The electrode assembly of this structure is easy to manufacture on the one hand, and reduces the phenomena of misalignment of the positive electrode plate and the negative electrode plate. On the other hand, by just setting neither end of the porous current collector of the negative electrode plate in the first direction to extend beyond the positive active material layer of the positive electrode plate, the entire porous current collector is ensured to be pressed by the body portion, thereby effectively suppressing the growth of lithium metal dendrites on the porous current collector.

In some embodiments, the porous current collector is made of a foamed metal.

In the above technical solution, the porous current collector made of a foamed metal makes the porous current collector capable of directly reacting with lithium ions, so as to implement input or output of electrical energy of the negative electrode plate. The porous current collector of this structure enables the lithium ions to deposit inside the porous current collector, thereby reducing the risk of lithium metal deposition on the surface of the porous current collector.

In some embodiments, the electrode assembly is a cylindrical structure.

In the above technical solution, the electrode assembly assumes a cylindrical structure. The electrode assembly of a cylindrical structure generates a smaller expansion force during use, so as to be applicable to the porous current collector made of a foamed metal.

According to a second aspect, an embodiment of this application further provides a battery cell. The battery cell includes a shell and the foregoing electrode assembly. The electrode assembly is accommodated in the shell.

According to a third aspect, an embodiment of this application further provides a battery, including the battery cell.

According to a fourth aspect, an embodiment of this application further provides an electrical device, including the battery cell.

BRIEF DESCRIPTION OF DRAWINGS

To describe technical solutions in embodiments of this application more clearly, the following outlines the drawings to be used in the embodiments. Understandably, the following drawings show merely some embodiments of this application, and therefore, are not intended to limit the scope. A person of ordinary skill in the art may derive other related drawings from the drawings without making any creative efforts.

Figure 1:
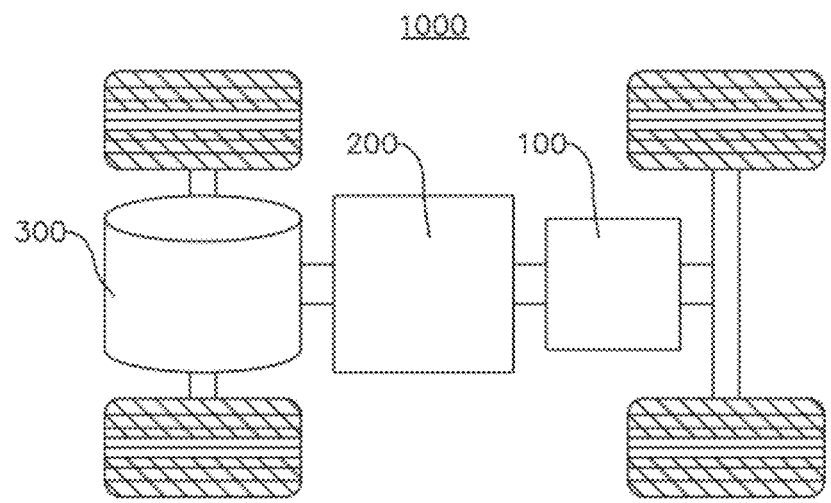
FIG. 1 is a schematic structural diagram of a vehicle according to some embodiments of this application.

List of reference numerals: 1000—vehicle; 100—battery; 10—box; 11—first box body; 12—second box body; 20—battery cell; 21—shell; 211—housing; 2111 opening; 212—end cap; 22—electrode assembly; 221—negative electrode plate; 2211 porous current collector; 2212—first tab; 2212a—body section; 2212b—transition section; 2213—weld mark; 2214—protection adhesive; 222—separator; 223—positive electrode plate; 2231—body portion; 22311 substrate; 22311a—first part; 22311b second part; 22312—positive active material layer; 22312a—first region; 22312b—second region; 2232—second tab; 224—insulation layer; 200—controller; 300—motor; X—first direction; Y—thickness direction of the porous current collector.

DETAILED DESCRIPTION

To make the objectives, technical solutions, and advantages of the embodiments of this application clearer, the following gives a clear description of the technical solutions in some embodiments of this application with reference to the drawings in some embodiments of this application. Evidently, the described embodiments are merely a part rather than all of the embodiments of this application. All other embodiments derived by a person of ordinary skill in the art based on the embodiments of this application without making any creative efforts still fall within the protection scope of this application.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

In embodiments of this application, the same reference numeral denotes the same component. For brevity, detailed descriptions of the same component are omitted in a different embodiment. Understandably, dimensions such as thickness, length, and width of various components in some embodiments of this application shown in the drawings, and dimensions such as overall thickness, length, and width of an integrated device are merely illustrative descriptions, but do not constitute any limitation on this application.

"A plurality of" referred to in this application means two or more (including two).

In this application, a battery cell may include a lithium-ion secondary battery, a lithium-ion primary battery, a lithium-sulfur battery, a sodium-ion battery, a magnesium-ion battery, or the like, without being limited herein. The battery cell may be in various shapes such as cylindrical, flat, cuboidal or other shapes. The shape of the battery cell is not limited herein. In terms of the packaging form, the battery cell is typically classed into three types: cylindrical battery cell, prismatic battery cell, and pouch-type battery cell. The type of the battery cell is not limited herein.

The battery mentioned in embodiments of this application means a unitary physical module that includes one or more battery cells to provide a higher voltage and a higher capacity. For example, the battery mentioned in this application may include a battery module, a battery pack, or the like. A battery typically includes a box configured to package one or more battery cells or a plurality of battery modules. The box prevents liquid or other foreign matters from affecting the charging or discharging of the battery cells.

A battery cell includes a shell, an electrode assembly, and an electrolyte solution. The shell is configured to accommodate the electrode assembly and the electrolyte solution.

The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. A surface of the positive current collector is coated with the positive active material layer. A part, uncoated with the positive active material layer, of the positive current collector serves as a positive tab, so that the electrical energy of the positive electrode plate is input or output through the positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate may include a negative current collector and a negative active material layer. A surface of the negative current collector is coated with the negative active material layer. A part, uncoated with the negative active material layer, of the negative current collector serves as a negative tab, so that the electrical energy of the negative electrode plate is input or output through the negative tab. The negative current collector may be made of copper, and a negative active material may be carbon, silicon, or the like. Alternatively, a foamed metal may be directly used as a negative electrode plate, and a part of the foamed metal is calendered to form a negative tab, or the negative tab is welded to the foamed metal. To prevent a large electrical current from tripping the circuit, a plurality of positive tabs are stacked together, and a plurality of negative tabs are stacked together.

The separator may be made of a material such as polypropylene (PP) or polyethylene (PE). In addition, the electrode assembly may be of a jelly-roll type structure or a stacked type structure, without being limited herein.

Batteries exhibit outstanding advantages such as a high energy density, low environmental pollution, a high power density, a long service life, a wide range of adaptability, and a small self-discharge coefficient, and are an important part of new energy development nowadays. A battery cell of the battery is prepared by making an electrode assembly (bare cell), putting the electrode assembly into a shell, and finally injecting an electrolyte solution into the shell. The electrode assembly is prepared by winding or stacking a positive electrode plate, a negative electrode plate, and a separator or by other means. However, with the ongoing development of the battery technology, higher requirements have been imposed on the performance, safety, and the like of the batteries in use. Therefore, the safety performance of a battery cell determines the safety of the battery in use.

The applicant finds that in the subsequent use of a battery, the electrode assembly of the battery cell is prone to a problem of lithium metal deposition. The problem is mainly manifested in the lithium metal deposition on a negative electrode plate of the electrode assembly. Consequently, phenomena such as deposition of dendrites usually occur on the surface of the negative electrode plate, thereby being very prone to damage the separator and pose a short circuit risk of the electrode assembly. To tackle the safety challenge posed by the lithium metal precipitation on the negative electrode plate, a foamed metal is used as a negative electrode plate of the electrode assembly, and the width of the negative electrode plate is set to be larger than that of the positive electrode plate. In this way, the risk of lithium plating of the electrode assembly is reduced, and at the same time, the lithium metal can be deposited inside the negative electrode plate. However, in a battery cell of this structure, a part of the negative electrode plate made of a foamed nickel extends beyond the positive electrode plate, and this part is not restrained by an expansion force. Therefore, the pressure on the entire negative electrode plate is not balanced, and a large amount of "dead lithium" is deposited on the part of the negative electrode plate, the part extending beyond the positive electrode plate. The dead lithium results in loss of active lithium and rapid fading of capacity, and is very prone to cause unrestrained growth of lithium metal dendrites. Consequently, the electrode assembly is prone to a short circuit between the positive electrode plate and the negative electrode plate when the separator is pierced by the lithium metal dendrites, thereby posing severe safety hazards to the battery cell during subsequent use, and being detrimental to the safety of the battery to be used by consumers.

Based on the above considerations, in order to tackle the severe safety hazards of the battery cell during subsequent use, the applicant hereof has designed an electrode assembly after in-depth research. The electrode assembly includes a negative electrode plate and a positive electrode plate. The negative electrode plate includes a porous current collector and a first tab connected to at least one end of the porous current collector. The positive electrode plate includes a body portion and a second tab connected to at least one end of the body portion. The body portion and the porous current collector are stacked along a thickness direction of the porous current collector. Along a first direction, neither end of the porous current collector extends beyond the body portion. The first direction is perpendicular to the thickness direction of the porous current collector.

In an electrode assembly of this structure, a porous current collector and a first tab protrusively disposed at minimally one end of the porous current collector are disposed on the negative electrode plate of the electrode assembly. A body portion and a second tab connected to at least one end of the body portion are disposed on the positive electrode plate of the electrode assembly. The porous current collector of the negative electrode plate and the body portion of the positive electrode plate are stacked together, and neither end of the porous current collector in the first direction is set to extend beyond the body portion of the positive electrode plate. In this way, the entire porous current collector of the negative electrode plate can be covered by the body portion of the positive electrode plate, thereby ensuring that the entire porous current collector of the negative electrode plate is pressed by the body portion. On the one hand, the above arrangement makes the current density uniform during charging of the electrode assembly. On the other hand, a restraining force is also applied to an edge of the porous current collector in the first direction, so as to induce the lithium metal on the porous current collector to deposit uniformly to alleviate a phenomenon of forming dendrites from the lithium metal deposited at the edge of the porous current collector. This can effectively suppress growth of dendrites of the lithium metal, reduce the risk of a short circuit in the electrode assembly, and reduce the phenomena that a large amount of "dead lithium" is deposited on the porous current collector and results in loss of active lithium and capacity fading, thereby enhancing the safety and performance of the electrode assembly in use.

The electrode assembly disclosed in an embodiment of this application is applicable to, but not limited to use in, electrical devices such as a vehicle, watercraft, or aircraft. A power supply system of the electrical devices may be formed by using the battery cell, the battery, and the like disclosed herein, so as to effectively reduce the short circuit risk of the battery cell during subsequent use and improve the safety of the battery in use.

An embodiment of this application provides an electrical device powered by a battery. The electrical device may be, but is not limited to, a mobile phone, a tablet, a laptop computer, an electric toy, an electric tool, an electric power cart, an electric vehicle, a ship, a spacecraft, or the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

For ease of description in the following embodiments, a vehicle 1000 is used as an example of the electrical device according to an embodiment of this application.

Referring to FIG. 1, FIG. 1 is a schematic structural diagram of a vehicle 1000 according to some embodiments of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000. The vehicle 1000 may further include a controller 200 and a motor 300. The controller 200 is configured to control the battery 100 to supply power to the motor 300, for example, to meet electrical energy requirements in starting, navigating, or running the vehicle 1000.

In some embodiments of this application, the battery 100 serves not only as an operating power supply of the vehicle 1000, but may also serve as a driving power supply of the vehicle 1000 to provide driving power for the vehicle 1000 in place of or partly in place of fuel oil or natural gas.

Figure 2:
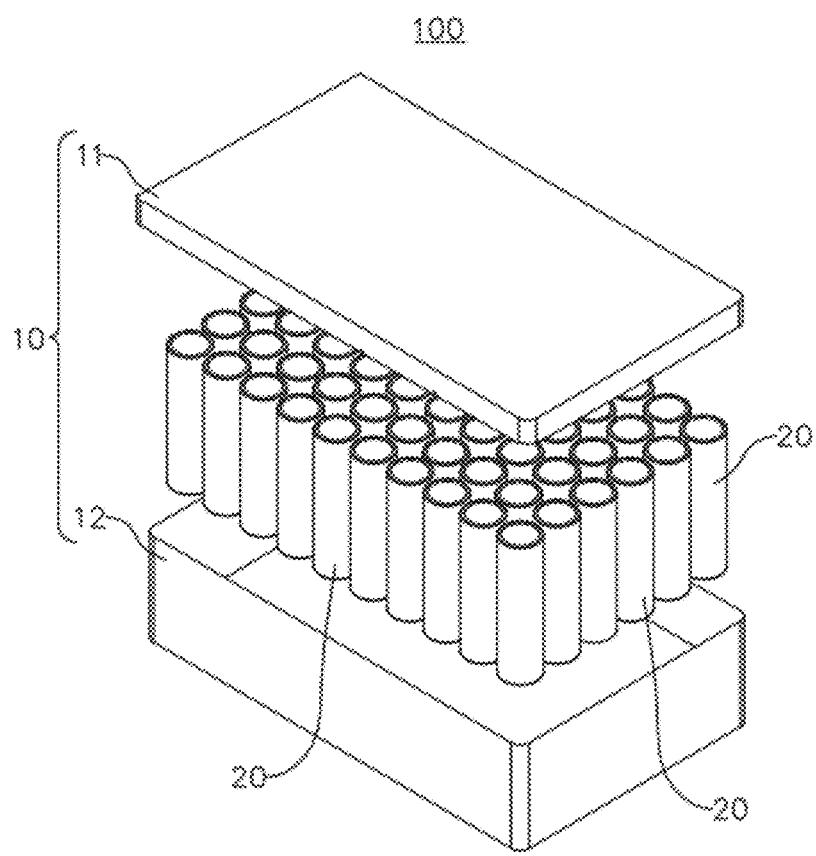
FIG. 2 is an exploded view of a battery according to some embodiments of this application.

Referring to FIG. 2, FIG. 2 is an exploded view of a battery 100 according to some embodiments of this application. The battery 100 includes a box 10 and a battery cell 20. The battery cell 20 is accommodated in the box 10. The box 10 is configured to provide an assembling space for the battery cell 20. The box 10 may assume various structures. In some embodiments, the box 10 may include a first box body 11 and a second box body 12. The first box body 11 and the second box body 12 fit each other. The first box body 11 and the second box body 12 together define an assembling space configured to accommodate the battery cell 20. The second box body 12 may be a hollow structure opened at one end. The first box body 11 may be a plate-like structure. The first box body 11 fits on an opening of the second box body 12 so that the first box body 11 and the second box body 12 together define the assembling space. Alternatively, both the first box body 11 and the second box body 12 may be hollow structures opened on one side. The opening of the first box body 11 fits the opening of the second box body 12. Definitely, the box 10 formed by the first box body 11 and the second box body 12 may be in various shapes such as a cylinder or a cuboid.

The battery 100 may contain a plurality of battery cells 20. The plurality of battery cells 20 may be connected in series, parallel, or series-and-parallel pattern. The series-and-parallel pattern means a combination of series connection and parallel connection of the plurality of battery cells 20. The plurality of battery cells 20 may be directly connected in series, parallel, or series-and-parallel pattern, and then the whole of the plurality of battery cells 20 may be accommodated in the box 10. Alternatively, the plurality of battery cells 20 may be connected in series, parallel, or series-and-parallel pattern to form a battery 100 in the form of battery modules first. A plurality of battery modules are then connected in series, parallel, or series-and-parallel pattern to form a whole for being accommodated in the box 10. The battery 100 may further include other structures. For example, the battery 100 may further include a busbar component. The busbar component is configured to implement electrical connection between the plurality of battery cells 20.

Each battery cell 20 may be, but is not limited to, a secondary battery or primary battery; or, may be a lithium-sulfur battery, a sodium-ion battery, or a magnesium-ion battery. The battery cell 20 may be in a shape such as a cylinder, a flat body, a cuboid, or other shapes. As an example, in FIG. 2, the battery cell 20 is a cylindrical structure.

Figure 3:
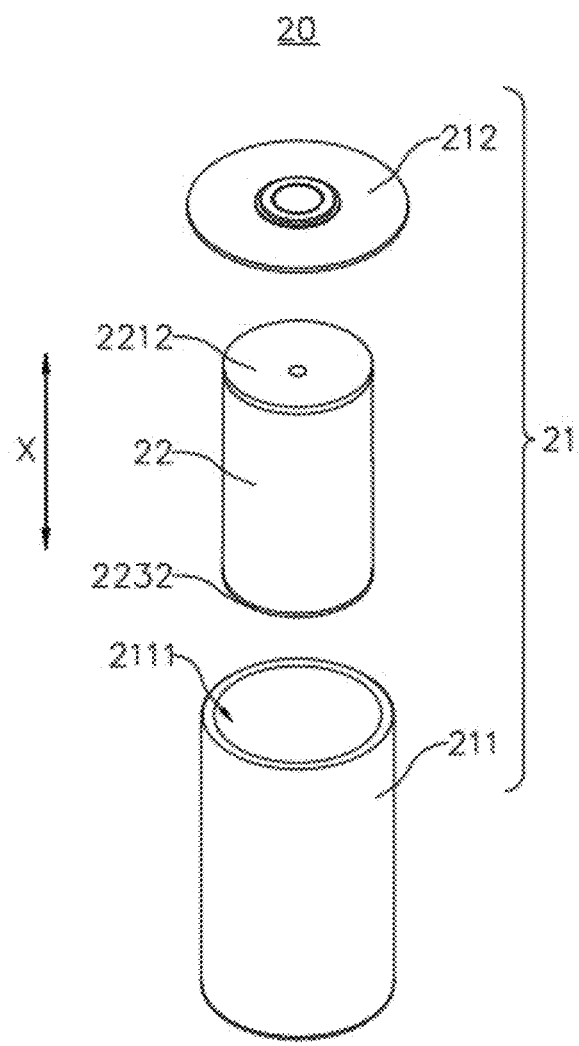
FIG. 3 is an exploded view of a battery cell according to some embodiments of this application.
Figure 4:
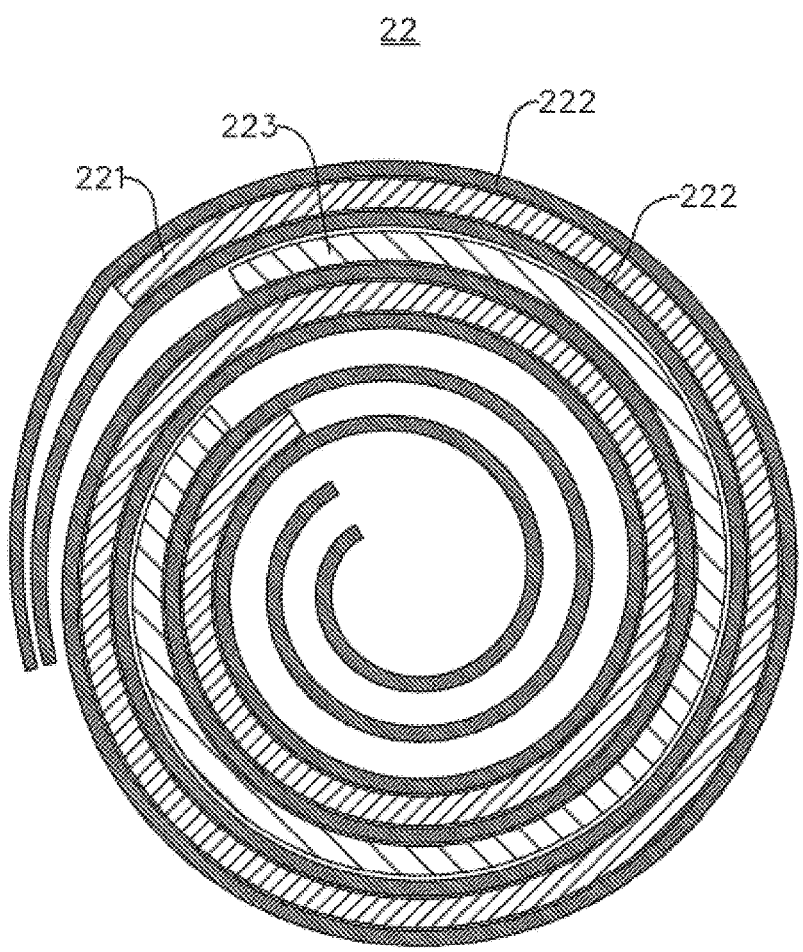
FIG. 4 is a cross-sectional view of an electrode assembly according to some embodiments of this application.

Referring to FIG. 3 and FIG. 4, FIG. 3 is an exploded view of a battery cell 20 according to some embodiments of this application, and FIG. 4 is a cross-sectional view of an electrode assembly 22 according to some embodiments of this application. A battery cell 20 includes a shell 21 and an electrode assembly 22. The shell 21 is configured to accommodate the electrode assembly 22.

The shell 21 may be further configured to accommodate an electrolyte such as an electrolyte solution. The shell 21 may assume various structural forms. The shell 21 may be made of a variety of materials such as copper, iron, aluminum, steel, or aluminum alloy.

In some embodiments, the shell 21 may include a housing 211 and an end cap 212. The housing 211 is a hollow structure with an opening 2111 created on one side. The end cap 212 fits on, and is hermetically connected to, the opening 2111 of the housing 211, to form a sealed space configured to accommodate the electrode assembly 22 and the electrolyte.

During assembling of the battery cell 20, the electrode assembly 22 may be put into the housing 211 first. The housing 211 is filled with an electrolyte, and then the end cap 212 fits on the opening 2111 of the housing 211.

The housing 211 may be in various shapes such as a cylinder or cuboid. The shape of the housing 211 may be determined depending on the specific shape of the electrode assembly 22. For example, if the electrode assembly 22 is a cylindrical structure, the housing may be a cylindrical housing. If the electrode assembly 22 is a cuboidal structure, the housing may be a cuboidal housing. Definitely, the end cap 212 may assume one of various structures. For example, the end cap 212 is a plate-like structure, a hollow structure with an opening 2111 created at one end, or the like. As an example, in FIG. 3, the electrode assembly 22 is a cylindrical structure. Correspondingly, the housing 211 is a cylindrical structure, the end cap 212 is a cylindrical plate-like structure, and the end cap 212 fits on the opening 2111 of the housing 211.

In some embodiments, the battery cell 20 may further include a positive electrode terminal and a negative electrode terminal. The positive electrode terminal is mounted on the end cap 212. The negative electrode terminal is mounted at one end of the housing 211, the end being opposite to the end cap 212. Alternatively, the positive electrode terminal is mounted at one end of the housing 211, the end is opposite to the end cap 212, and the negative electrode terminal is mounted on the end cap 212. Both the positive electrode terminal and the negative electrode terminal are configured to be electrically connect to the electrode assembly 22, so as to implement input or output of electrical energy of the battery cell 20. The positive electrode terminal and the negative electrode terminal may be directly connected to the electrode assembly 22, for example, by welding or butt-jointing. Alternatively, the positive electrode terminal and the negative electrode terminal may be indirectly connected to the electrode assembly 22. For example, the positive electrode terminal and the negative electrode terminal are butt-jointed or welded to the electrode assembly 22 through a current collecting component.

Understandably, the shell 21 is not limited to the structures enumerated above. The shell 21 may be another structure instead. For example, the shell 21 includes a housing 211 and two end caps 212. The housing 211 is a hollow structure with openings 2111 created on two opposite sides. One end cap 212 fits on, and is hermetically connected to, one corresponding opening 2111 of the housing 211, to form a sealed space configured to accommodate the electrode assembly 22 and the electrolyte.

In some embodiments, the battery cell 20 may further include a pressure relief mechanism. The pressure relief mechanism is mounted on the end cap 212, or mounted on the housing 211. The pressure relief mechanism is configured to release pressure inside the battery cell 20 when an internal pressure or temperature of the battery cell 20 reaches a preset value.

As an example, the pressure relief mechanism may be a component such as an explosion-proof valve, a rupture disk, a gas valve, a pressure relief valve, or a safety valve.

It is hereby noted that the electrode assembly 22 is a component in which electrochemical reactions occur in the battery cell 20. The electrode assembly 22 may include a negative electrode plate 221, a separator 222, and a positive electrode plate 223. The electrode assembly 22 may be a jelly-roll structure formed by winding the negative electrode plate 221, the separator 222, and the positive electrode plate 223, or a stacked structure formed by stacking the negative electrode plate 221, the separator 222, and the positive electrode plate 223. As an example, in FIG. 4, the electrode assembly 22 is a jelly-roll structure formed by winding the negative electrode plate 221, the separator 222, and the positive electrode plate 223.

Figure 5:
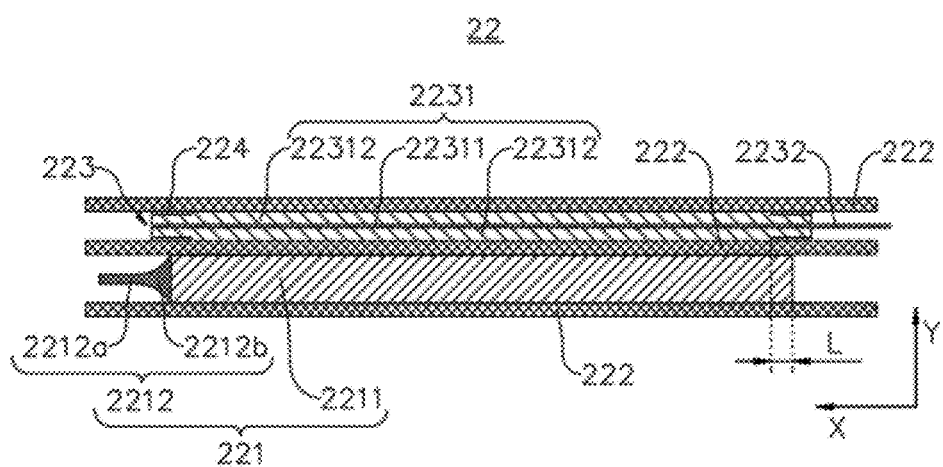
FIG. 5 is a partial cross-sectional view of an electrode assembly according to some embodiments of this application.

According to some embodiments of this application, referring to FIG. 3 and FIG. 4 together with FIG. 5, FIG. 5 is a partial cross-sectional view of an electrode assembly 22 according to some embodiments of this application. This application provides an electrode assembly 22. The electrode assembly 22 includes a negative electrode plate 221 and a positive electrode plate 223. The negative electrode plate 221 includes a porous current collector 2211 and a first tab 2212 connected to at least one end of the porous current collector 2211. The positive electrode plate 223 includes a body portion 2231 and a second tab 2232 connected to at least one end of the body portion 2231. The body portion 2231 and the porous current collector 2211 are stacked along a thickness direction Y of the porous current collector. Along a first direction X, neither end of the porous current collector 2211 extends beyond the body portion 2231. The first direction X is perpendicular to the thickness direction Y of the porous current collector.

The porous current collector 2211 of the negative electrode plate 221 is a structure with a plurality of pores, and may be a foamed metal or a mesh structure woven from metal wires.

The first tab 2212 is connected to at least one end of the porous current collector 2211. In other words, the first tab 2212 is connected to at least one end of the porous current collector 2211 in a direction perpendicular to the thickness direction Y of the porous current collector. The first tab 2212 may be connected to one end of the porous current collector 2211; or both ends of the porous current collector 2211 are connected to the first tab 2212. The first tab 2212 serves as a negative output electrode of the electrode assembly 22. The first tab 2212 is configured to be connected to the negative electrode terminal to implement input or output of electrical energy of the electrode assembly 22.

As an example, in FIG. 5, the first tab 2212 is connected to one end of the porous current collector 2211 in the first direction X. Alternatively, in some other embodiments, the first tab 2212 may be connected to one end of the porous current collector 2211 in a direction perpendicular to the first direction X and the thickness direction Y of the porous current collector. It is hereby noted that "the first tab 2212 is connected to one end of the porous current collector 2211 in the first direction X" means that the first tab 2212 is connected to one end of the porous current collector 2211 in the first direction X, or means that the first tab is connected to one side of the porous current collector 2211, the side being oriented toward the body portion 2231 in the thickness direction Y of the porous current collector, as long as the first tab 2212 extends along the first direction X and protrudes beyond one end of the porous current collector 2211 in the first direction X.

It is hereby noted that, in FIG. 3, FIG. 4, and FIG. 5, the electrode assembly 22 is a jelly-roll structure. The thickness direction Y of the porous current collector is a radial direction of the electrode assembly 22. The first direction X is a width direction of the negative electrode plate 221, and is also an extension direction of the winding center axis of the electrode assembly 22. Alternatively, the first direction X may be the winding direction of the electrode assembly 22, that is, the first direction X is an extension direction of the negative electrode plate 221. When the first direction X is the extension direction of the negative electrode plate 221, that the first direction X is perpendicular to the thickness direction Y of the porous current collector means that a tangent line of an intersection point in the first direction X is perpendicular to the thickness direction Y of the porous current collector, where the intersection point is a point of intersection between the first direction X and the thickness direction Y of the porous current collector. In some embodiments, if the electrode assembly 22 is a stacked structure, that is, if the negative electrode plate 221 and the positive electrode plate 223 are alternately stacked along the thickness direction Y of the porous current collector, then the first direction X in these embodiments may be a width direction of the negative electrode plate 221 or a length direction of the negative electrode plate 221. Definitely, if, in a stacked electrode assembly 22, the negative electrode plate 221 is continuously folded into a Z-shaped structure, and the positive electrode plate 223 is alternately stacked between the negative electrode plates 221, then the first direction X is the width direction of the negative electrode plate 221.

The second tab 2232 is connected to at least one end of the body portion 2231. In other words, the second tab 2232 is connected to at least one end of the body portion 2231 in a direction perpendicular to the thickness direction Y of the porous current collector. The second tab 2232 may be connected to one end of the body portion 2231; or both ends of the body portion 2231 are connected to the second tab 2232. The second tab 2232 serves as a positive output electrode of the electrode assembly 22. The second tab 2232 is configured to be connected to the positive electrode terminal to implement input or output of electrical energy of the electrode assembly 22.

As an example, in FIG. 5, the second tab 2232 is connected to one end of the body portion 2231 in the first direction X. Alternatively, in some other embodiments, the second tab 2232 may be connected to one end of the body portion 2231 in a direction perpendicular to the first direction X and the thickness direction Y of the porous current collector.

It is hereby noted that the second tab 2232 is a part protruding from one end of the body portion 2231 in the first direction X, and the thickness of the second tab 2232 in the thickness direction Y of the porous current collector is less than the thickness of the body portion 2231. In other words, the body portion 2231 of the positive electrode plate 223 is a part of the positive electrode plate 223, the part being configured to stack together with the porous current collector 2211 of the negative electrode plate 221. The body portion 2231 of the positive electrode plate 223 can apply a squeezing force to the porous current collector 2211 of the negative electrode plate 221 in the thickness direction Y of the porous current collector.

Along the first direction X, neither end of the porous current collector 2211 extends beyond the body portion 2231. To be specific, in the first direction X, both ends of the body portion 2231 extend beyond the porous current collector fluid 2211; or, one end of the body portion 2231 extends beyond the porous current collector 2211, and the other end of the body portion is flush with one end of the porous current collector 2211; or, the two ends of the body portion 2231 are flush with the two ends of the porous current collector 2211. As an example, in FIG. 5, both ends of the body portion 2231 extend beyond the porous current collector 2211.

A porous current collector 2211 and a first tab 2212 protrusively disposed at minimally one end of the porous current collector 2211 are disposed on the negative electrode plate 221 of the electrode assembly 22. A body portion 2231 and a second tab 2232 connected to at least one end of the body portion 2231 are disposed on the positive electrode plate 223 of the electrode assembly 22. The porous current collector 2211 of the negative electrode plate 221 and the body portion 2231 of the positive electrode plate 223 are stacked together, and neither end of the porous current collector 2211 in the first direction X is set to extend beyond the body portion 2231 of the positive electrode plate 223. In this way, the entire porous current collector 2211 of the negative electrode plate 221 can be covered by the body portion 2231 of the positive electrode plate 223, thereby ensuring that the entire porous current collector 2211 of the negative electrode plate 221 is pressed by the body portion 2231. On the one hand, the above arrangement makes the current density uniform during charging of the electrode assembly 22. On the other hand, a restraining force is also applied to an edge of the porous current collector 2211 in the first direction X, so as to induce the lithium metal on the porous current collector 2211 to deposit uniformly to alleviate a phenomenon of forming dendrites from the lithium metal deposited at the edge of the porous current collector 2211. This can effectively suppress growth of dendrites of the lithium metal, reduce the risk of a short circuit in the electrode assembly 22, and reduce the phenomena that a large amount of "dead lithium" is deposited on the porous current collector 2211 and results in loss of active lithium and capacity fading, thereby enhancing the safety and performance of the electrode assembly 22 in use.

According to some embodiments of this application, referring to FIG. 4 and FIG. 5, the body portion 2231 includes a substrate 22311 and a positive active material layer 22312. The second tab 2232 is connected to the substrate 22311. The positive active material layer 22312 is disposed on one side of the substrate 22311, where the side is oriented toward the porous current collector 2211 in the thickness direction Y of the porous current collector. Along the first direction X, neither end of the porous current collector 2211 extends beyond the positive active material layer 22312. The insulation layer 224 is disposed on one side of the positive active material layer 22312, the side is oriented toward the porous current collector 2211, and the insulation layer 224 covers one end of the positive active material layer 22312.

Along the thickness direction Y of the porous current collector, the negative electrode plate 221 is disposed on both sides of the positive electrode plate 223. Correspondingly, both sides of the substrate 22311 of the body portion 2231 of the positive electrode plate 223 are coated with the positive active material layer 22312. The positive active material layer 22312 and the porous current collector 2211 of the negative electrode plate 221 are chemical reaction regions in the battery cell 20, and primarily work by shuttling metal ions between the positive active material layer 22312 and the porous current collector 2211.

As an example, the positive active material layer 22312 may be made of lithium cobalt oxide, lithium iron phosphate, ternary lithium, lithium manganese oxide, or the like.

In FIG. 5, the second tab 2232 and the substrate 22311 are a one-piece structure. To be specific, the second tab 2232 is a region by which the substrate 22311 extends beyond the positive active material layer 22312 and the insulation layer 224 in the first direction X. Alternatively, in other embodiments, the second tab 2232 and the substrate 22311 are separate structures instead. The second tab 2232 is connected to one end of the substrate 22311 in the first direction X by welding or other means, so as to enable the second tab 2232 to protrude beyond one end of the body portion 2231 in the first direction X.

As an example, the substrate 22311 may be made of a material such as copper, iron, aluminum, steel, or aluminum alloy.

An insulation layer 224 is disposed on one side of the positive active material layer 22312, the side being oriented toward the porous current collector 2211. The insulation layer 224 covers one end of the positive active material layer 22312. To be specific, the insulation layer 224 is disposed on one side of the positive active material layer 22312, the side being oriented toward the porous current collector 2211 in the thickness direction Y of the porous current collector. In addition, a projection of the insulation layer 224 in the thickness direction Y of the porous current collector covers one end of the positive active material layer 22312 in the first direction X. In other words, the insulation layer 224 extends along the first direction X to an edge of the positive active material layer 22312 in the first direction X. In this embodiment, the insulation layer 224 may be connected to the positive active material layer 22312, or connected to the separator 222 disposed between the positive electrode plate 223 and the negative electrode plate 221.

Figure 6:
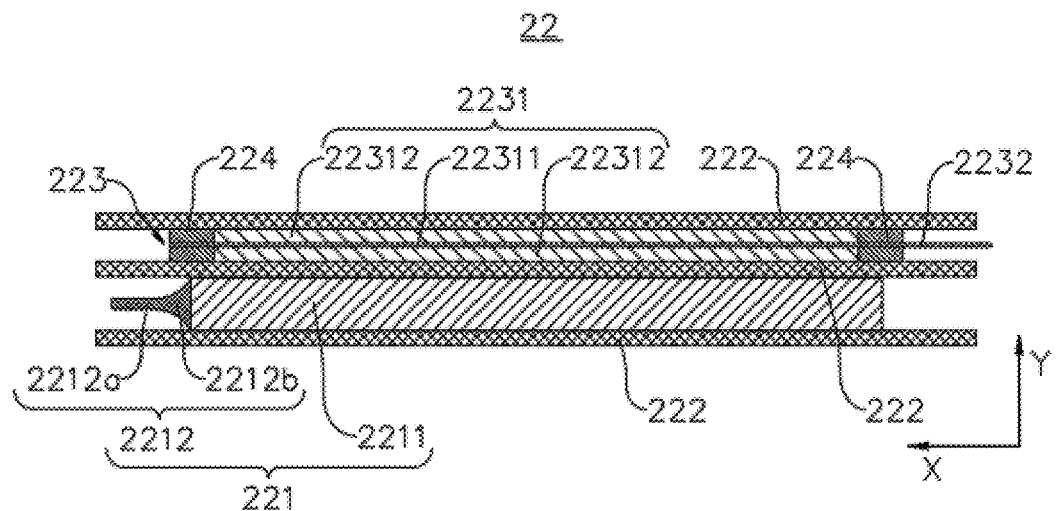
FIG. 6 is a partial cross-sectional view of an electrode assembly according to some other embodiments of this application.

In FIG. 5, both ends of the porous current collector 2211 in the first direction X are set to be structures that do not extend beyond the positive active material layer 22312. The insulation layer 224 is disposed on one side of the positive active material layer 22312, the side being oriented toward the porous current collector 2211. In this way, a structure is constructed in which neither end of the porous current collector 2211 in the first direction X extends beyond the body portion 2231. Therefore, the two edges of the porous current collector 2211 in the first direction X are subjected to an expansion restraining force of the body portion 2231 of the positive electrode plate 223. Definitely, in some embodiments, referring to FIG. 6, FIG. 6 is a partial cross-sectional view of an electrode assembly 22 according to still some other embodiments of this application. The electrode assembly 22 may be another structure instead. The body portion 2231 includes a positive active material layer 22312 and an insulation layer 224, and the insulation layer is connected to two ends of the positive active material layer 22312 in the first direction X. Neither end of the positive active material layer 22312 in the first direction X is set to extend beyond the porous current collector 2211. The insulation layer 224 extends beyond one end of the porous current collector 2211 along the first direction X, so as to achieve a structure in which neither end of the porous current collector 2211 in the first direction X extends beyond the body portion 2231. In this way, both edges of the porous current collector 2211 in the first direction X are ensured to be subjected to an expansion restraining force of the body portion 2231 of the positive electrode plate 223. In this embodiment, the second tab 2232 is a region in which the substrate 22311 extends beyond the insulation layer 224 in the first direction X.

Figure 7:
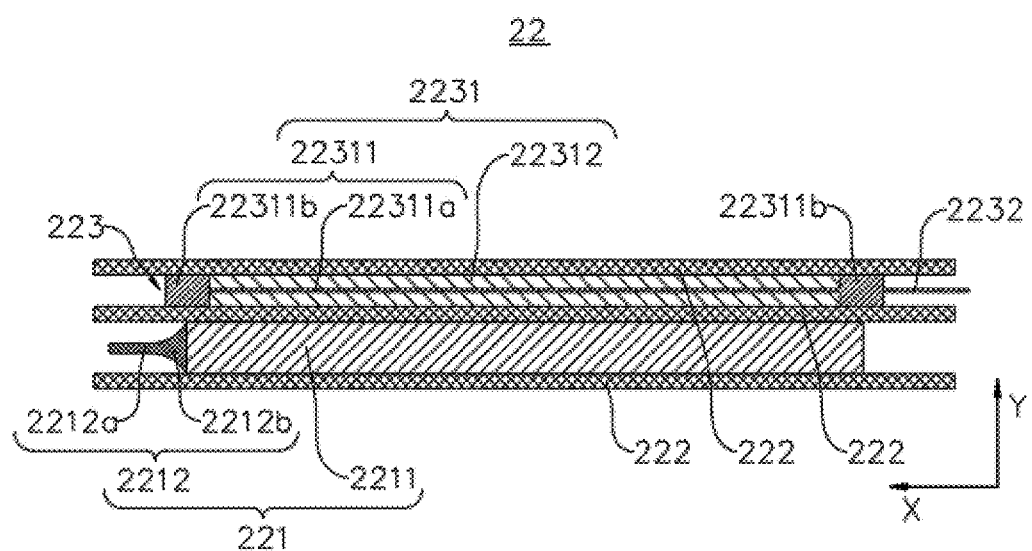
FIG. 7 is a partial cross-sectional view of an electrode assembly according to still some other embodiments of this application.

It is hereby noted that, in some embodiments, the insulation layer 224 does not need to be disposed on the body portion 2231 of the positive electrode plate 223 of the electrode assembly 22. Referring to FIG. 7, FIG. 7 is a partial cross-sectional view of the electrode assembly 22 according to yet some other embodiments of this application. The body portion 2231 includes a substrate 22311 and a positive active material layer 22312. The substrate 22311 includes a first part 22311*a* and a second part 22311*b* connected to two ends of the first part 22311*a* in the first direction X. The thickness of the first part 22311*a* in the thickness direction Y of the porous current collector is less than the thickness of the second part 22311*b*. The positive active material layer 22312 is disposed on one side of the first part 22311*a*, the side being oriented toward the porous current collector 2211. The positive active material layer 22312 is located between the two second parts 22311*b* in the first direction X. In the thickness direction Y of the porous current collector, a surface, oriented toward the porous current collector 2211, of the positive active material layer 22312, is flush with a surface, oriented toward the porous current collector 2211, of the second part 22311*b*. In other words, the substrate 22311 is a structure thickened at both ends of the positive active material layer 22312 along the first direction X. Neither end of the positive active material layer 22312 in the first direction X extends beyond the porous current collector 2211. The second part 22311*b* extends beyond one end of the porous current collector 2211 in the first direction X. In this way, a structure is constructed in which neither end of the porous current collector 2211 in the first direction X extends beyond the body portion 2231. Therefore, the two edges of the porous current collector 2211 in the first direction X are subjected to an expansion restraining force of the body portion 2231 of the positive electrode plate 223. In this embodiment, the second tab 2232 is connected to one end of the second part 22311*b* in the first direction X, the end being away from the first part 22311*a*.

The substrate 22311 and the positive active material layer 22312 are disposed on the body portion 2231, and the positive active material layer is disposed on one side of the substrate 22311 in the thickness direction Y of the porous current collector. In this way, the positive active material layer 22312 and the porous current collector 2211 face each other in the thickness direction Y of the porous current collector. Neither end of the porous current collector 2211 in the first direction X is set to extend beyond the positive active material layer 22312, so that the positive active material layer 22312 can cover the porous current collector 2211, thereby making the entire porous current collector 2211 subjected to a restraining force of the positive active material layer 22312. This structure is simple and easy to manufacture. In addition, the insulation layer 224 is disposed on one side of the positive active material layer 22312, the side being oriented toward the porous current collector 2211. The insulation layer 224 covers one end of the positive active material layer 22312. On the one hand, the electrode assembly 22 of this structure can block lithium ions to some extent through the insulation layer 224, where the lithium ions are precipitated by a part of the positive active material layer 22312, the part extending beyond the porous current collector 2211. This helps to reduce the phenomena of depositing the lithium ions at the edge of the porous current collector 2211. On the other hand, the insulation layer 224 can obstruct, to some extent, the lithium metal dendrites formed at the edge of the porous current collector 2211 in the first direction X, thereby alleviating the phenomenon of a short circuit between the negative electrode plate 221 and the positive electrode plate 223 caused by the lithium metal dendrites, and in turn, effectively reducing the safety hazards of the electrode assembly 22 in use.

Figure 8:
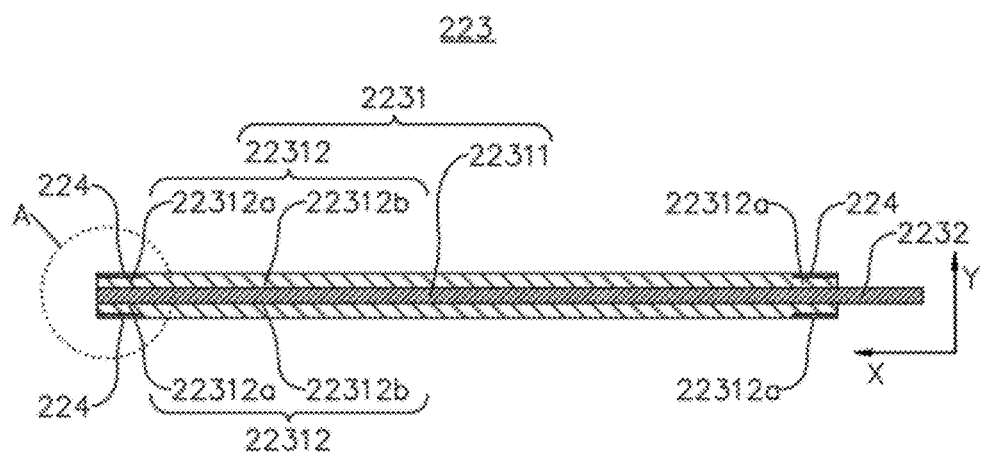
FIG. 8 is a cross-sectional view of a positive electrode plate of an electrode assembly according to some embodiments of this application.
Figure 9:
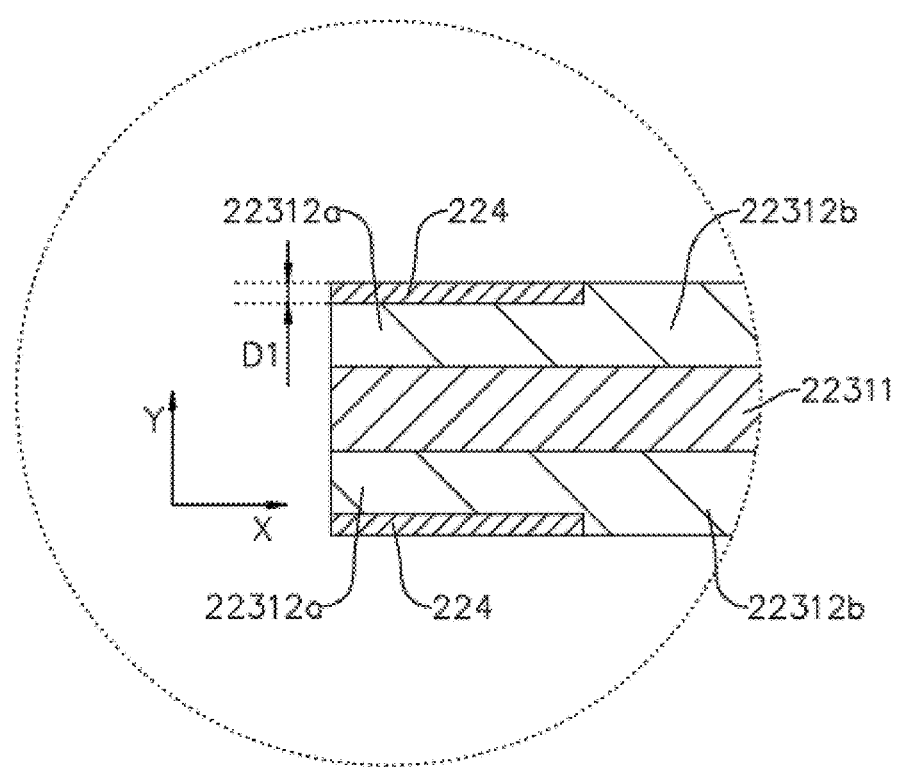
FIG. 9 is a close-up view of a part A of the positive electrode plate shown in FIG. 8.

According to some embodiments of this application, referring to FIG. 5 together with FIG. 8 and FIG. 9, FIG. 8 is a cross-sectional view of a positive electrode plate 223 of an electrode assembly 22 according to some embodiments of this application, and FIG. 9 is a close-up view of a part A of the positive electrode plate 223 shown in FIG. 8. The positive active material layer 22312 includes a first region 22312*a* and a second region 22312*b*. Along the first direction X, the first region 22312*a* is connected to at least one end of the second region 22312*b*. The insulation layer 224 covers the first region 22312*a*. Along the first direction X, the second region 22312*b* does not extend beyond the porous current collector 2211.

The first region 22312*a* is a region of the positive active material layer 22312, the region being covered by the insulation layer 224 in the thickness direction Y of the porous current collector. The second region 22312*b* is a region of the positive active material layer 22312, the region being not covered by the insulation layer 224 in the thickness direction Y of the porous current collector.

As an example, in FIG. 8, two insulation layers 224 are disposed on one side of the positive active material layer 22312, the side being oriented toward the porous current collector 2211. The two insulation layers 224 cover two ends of the positive active material layer 22312 in the first direction X respectively. Correspondingly, two first regions 22312*a* are formed on the positive active material layer 22312. The two first regions are connected to the two ends of the second region 22312*b* along the first direction X respectively. Alternatively, in some embodiments, a single insulation layer 224 may be disposed on one side of the positive active material layer 22312, the side being oriented toward the porous current collector 2211. Correspondingly, a single first region 22312*a* is formed on the positive active material layer 22312.

Along the first direction X, the second region 22312*b* does not extend beyond the porous current collector 2211. In other words, in a region not covered by the insulation layer 224, neither end of the positive active material layer 22312 extends beyond the porous current collector 2211 in the first direction X.

The insulation layer 224 is set to cover the first region 22312*a* of the positive active material layer 22312. The second region 22312*b* is set to extend beyond the porous current collector 2211 at neither end in the first direction X, so as to make the dimension of an effective region in the first direction X less than or equal to the dimension of the porous current collector 2211, where the effective region is a region in which the positive active material layer 22312 and the porous current collector 2211 face each other. On the one hand, this can alleviate the lithium plating phenomenon of the electrode assembly 22 in use. On the other hand, the insulation layer 224 can play a more effective role in obstructing the lithium metal dendrites formed at the edge of the porous current collector 2211 in the first direction X.

According to some embodiments of this application, referring to FIG. 5 and FIG. 8, two insulation layers 224 are disposed on one side of the positive active material layer 22312, the side being oriented toward the porous current collector 2211. The two insulation layers 224 cover two ends of the positive active material layer 22312 respectively.

That the two insulation layers 224 cover two ends of the positive active material layer 22312 respectively means: two insulation layers 224 are disposed on one side of the positive active material layer 22312, where the side is oriented toward the porous current collector 2211, and the two insulation layers 224 extend to the two ends of the positive active material layers 22312 along the first direction X respectively.

Two insulation layers 224 are disposed on one side of the positive active material layer 22312, and the side is oriented toward the porous current collector 2211, so that the two insulation layers 224 can cover the two ends of the positive active material layer 22312 in the first direction X respectively, thereby blocking the lithium metal precipitated at the two ends of the positive active material layer 22312 in the first direction X, and obstructing the lithium metal dendrites formed at the two edges of the porous current collector 2211 in the first direction X, and in turn, further enhancing the safety of the electrode assembly 22 in use.

Figure 10:
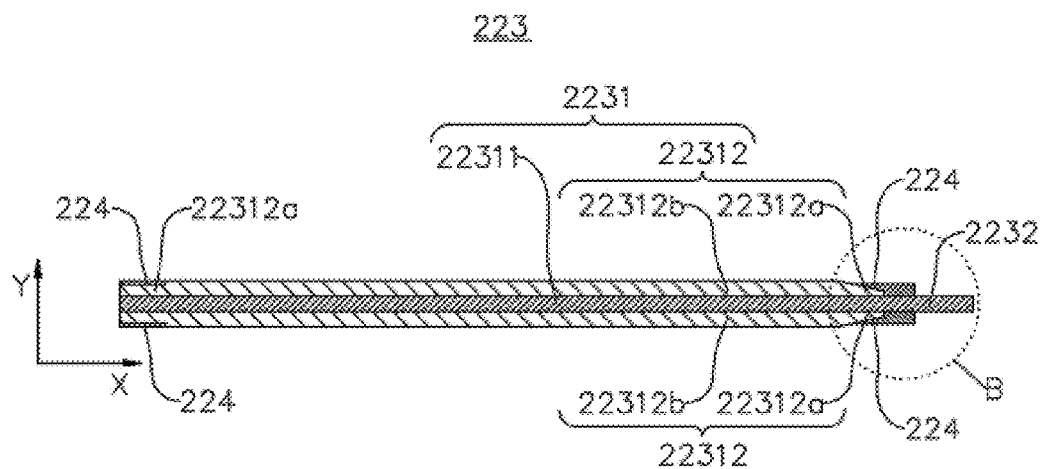
FIG. 10 is a cross-sectional view of a positive electrode plate of an electrode assembly provided in some embodiments of this application and applied in other embodiments.
Figure 11:
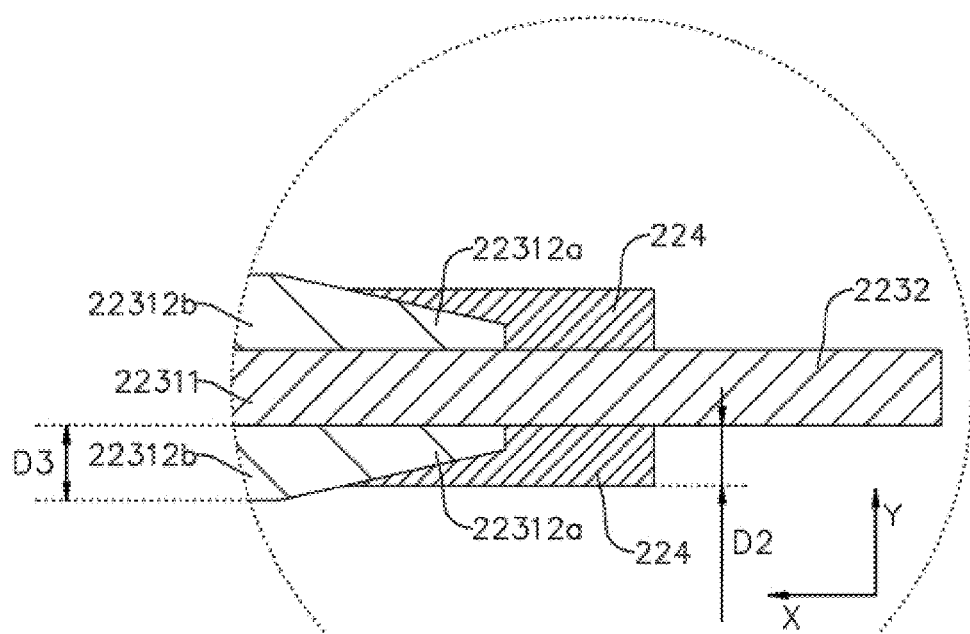
FIG. 11 is a close-up view of a part B of a positive electrode plate.

According to some embodiments of this application, referring to FIG. 10 and FIG. 11, FIG. 10 is a cross-sectional view of a positive electrode plate 223 of an electrode assembly 22 provided in some embodiments of this application and applied in other embodiments. FIG. 11 is a close-up view of a part B of the positive electrode plate 223 shown in FIG. 10. Along the first direction X, the insulation layer 224 extends beyond one end of the positive active material layer 22312.

That the insulation layer 224 extends beyond one end of the positive active material layer 22312 along the first direction X means: a part of the insulation layer 224 is disposed at one end of the positive active material layer 22312 in the first direction X. In other words, a part of the insulation layer 224 in the first direction X is disposed on the positive active material layer 22312, and another part of the insulation layer is disposed on the substrate 22311. In this embodiment, the second tab 2232 is a region in which the substrate 22311 extends beyond the insulation layer 224.

As an example, in FIG. 10, the two insulation layers 224 are disposed on one side of the positive active material layer 22312, the side being oriented toward the porous current collector 2211. Among the two insulation layers, one insulation layer 224 extends beyond one end of the positive active material layer 22312 along the first direction X, and the other insulation layer 224 is flush with one end of the positive active material layer 22312 in the first direction X. However, the structure of the positive electrode plate 223 is not limited to such examples. In some other embodiments, two insulation layers 224 may extend beyond two ends of the positive active material layer 22312 along the first direction X respectively.

The insulation layer 224 includes an end extending beyond the positive active material layer 22312 in the first direction X. In other words, in the first direction X, the insulation layer 224 includes a part extending beyond one end of the positive active material layer 22312. On the one hand, this enables the insulation layer 224 to more effectively cover one end of the positive active material layer 22312. On the other hand, the insulation layer 224 well protects one end of the positive active material layer 22312 in the first direction X, and makes it convenient to cut and process the positive electrode plate 223 during manufacturing of the electrode assembly 22.

According to some embodiments of this application, referring to FIG. 5, along the thickness direction Y of the porous current collector, a part of the insulation layer 224 overlaps the porous current collector 2211. A width of the overlap part between the insulation layer 224 and the porous current collector 2211 in the first direction X is L, satisfying: 1 mm≤L≤3.5 mm.

That the width of the overlap part between the insulation layer 224 and the porous current collector 2211 in the first direction X is L means: the dimension of a part of the insulation layer 224 is L, where the part does not extend beyond one end of the porous current collector 2211 in the first direction X.

The width of the overlap part between the insulation layer 224 and the porous current collector 2211 in the first direction X is set to fall within the range of 1 mm to 3.5 mm. On the one hand, the setting alleviates a low effect of the insulation layer 224 in obstructing the lithium metal dendrites and blocking the precipitated lithium ions, where the low effect is caused by a deficient width of the overlap between the insulation layer 224 and the porous current collector 2211. The setting can also alleviate the problem of high difficulty of manufacturing caused by the deficient width of the overlap between the insulation layer 224 and the porous current collector 2211. On the other hand, the setting alleviates the phenomenon of an excessive coverage area of the insulation layer 224 covering the positive active material layer 22312, where the excessive coverage area is caused by an excessive overlap width between the insulation layer 224 and the porous current collector 2211, and results in much loss of capacity of the electrode assembly 22.

In some embodiments, referring to FIG. 9, the thickness of the insulation layer 224 along the thickness direction Y of the porous current collector is $D_1$, satisfying: $D_1 \geq 10$ μm.

The thickness of the insulation layer 224 is $D_1$. That is, the maximum thickness of the insulation layer 224 in the thickness direction Y of the porous current collector is $D_1$.

As an example, the thickness $D_1$ of the insulation layer 224 may be 10 μm, 11 μm, 15 μm, 20 μm, 30 μm, or the like.

According to some embodiments of this application, referring to FIG. 8, FIG. 9, FIG. 10, and FIG. 11, the insulation layer 224 is connected to the positive active material layer 22312.

The insulation layer 224 is connected to the positive active material layer 22312 in various ways, for example, by bonding, adsorption, or other means.

The insulation layer 224 is connected to the positive active material layer 22312 so that the insulation layer 224 can cover one end of the positive active material layer 22312 in the first direction X. On the one hand, the electrode assembly 22 of such a structure improves the effect of the insulation layer 224 in covering the positive active material layer 22312, and reduces the difficulty of assembling the electrode assembly 22. On the other hand, the insulation layer 224 can suppress lithium ion precipitation from the covered region of the positive active material layer 22312, thereby reducing the lithium plating risk of the electrode assembly 22 in use, and reducing the phenomenon of lithium ion deposition at the edge of the porous current collector 2211.

According to some embodiments of this application, referring to FIG. 10 and FIG. 11, the positive active material layer 22312 includes a first region 22312a and a second region 22312b. Along the first direction X, the first region 22312a is connected to at least one end of the second region 22312b. The insulation layer 224 covers the first region 22312a. Along the thickness direction Y of the porous current collector, a sum of thicknesses of the first region 22312a and the insulation layer 224 at the same position is $D_2$, and a thickness of the second region 22312b is $D_3$, satisfying: $-80 \ \mu m \leq D_2 - D_3 \leq 10 \ \mu m$.

That the sum of thicknesses of the first region 22312a and the insulation layer 224 at the same position along the thickness direction Y of the porous current collector is $D_2$ means: the thickness of the first region 22312a and the insulation layer 224 stacked in the thickness direction Y of the porous current collector is $D_2$.

The relational expression $-80 \ \mu m \leq D_2 - D_3 \leq 10 \ \mu m$ means that the dimension by which the insulation layer 224 protrudes beyond the second region 22312b in the thickness direction Y of the porous current collector is 0 μm to 10 μm, or the dimension by which the second region 22312b protrudes beyond the insulation layer 224 in the thickness direction Y of the porous current collector is 0 μm to 80 μm.

In the thickness direction Y of the porous current collector, the difference between a thickness sum and the thickness of the second region 22312b is set to fall within the range of −80 μm to 10 μm, where the thickness sum is a sum of the thickness of the first region 22312a of the positive active material layer 22312 and the thickness of the insulation layer 224 at the same position. The electrode assembly 22 of this structure can alleviate the phenomenon of an overlarge clearance between the positive active material layer 22312 and the porous current collector 2211. On the one hand, the above setting alleviates the phenomenon of an overly high internal resistance of the electrode assembly 22 caused by the overlarge clearance between the positive active material layer 22312 and the porous current collector 2211. On the other hand, the above setting alleviates the lithium plating risk of the electrode assembly 22 caused by the overlarge clearance between the positive active material layer 22312 and the porous current collector 2211.

According to some embodiments of this application, referring to FIG. 8 and FIG. 9, the positive active material layer 22312 includes a first region 22312a and a second region 22312b. Along the first direction X, the first region 22312a is connected to at least one end of the second region 22312b. The insulation layer 224 covers the first region 22312a, and the thickness of the first region 22312a is less than the thickness of the second region 22312b.

That the thickness of the first region 22312a is less than the thickness of the second region 22312b means that a thinned region is formed on the positive active material layer 22312, and the insulation layer 224 is disposed in the thinned region of the positive active material layer 22312.

Figure 12:
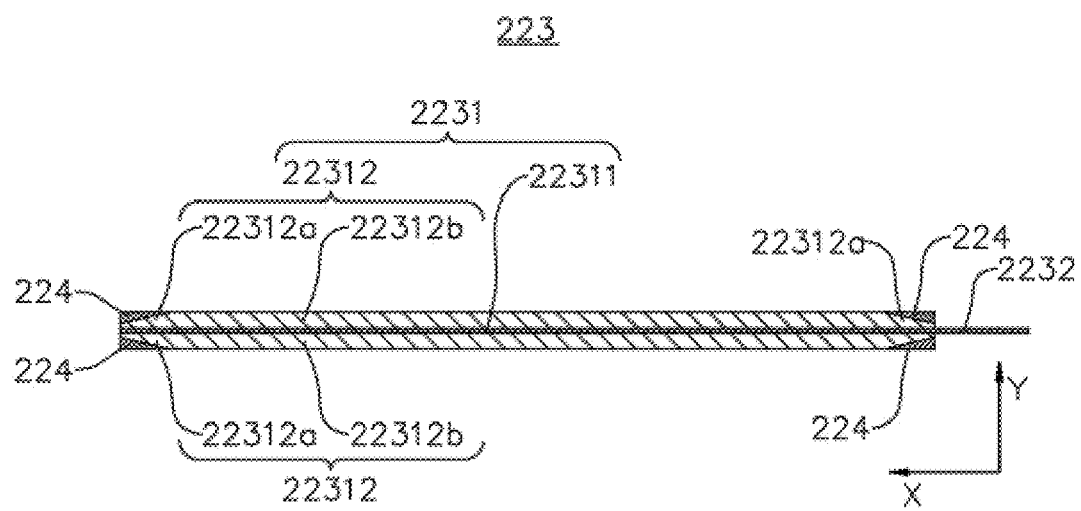
FIG. 12 is a cross-sectional view of a positive electrode plate of an electrode assembly provided in some embodiments of this application and applied in some other embodiments.

The positive electrode plate 223 may assume various structures. For example, in FIG. 9, in the thickness direction Y of the porous current collector, the thickness of the first region 22312a is less than the thickness of the second region 22312b. In addition, a surface, oriented away from the substrate 22311, of the first region 22312a is parallel to a surface, oriented away from the substrate 22311, of the second region 22312b. In other words, a groove configure to accommodate the insulation layer 224 is created on the surface, oriented away from the substrate 22311, of the positive active material layer 22312. The region in which the groove is formed on the positive active material layer 22312 is the first region 22312a. Definitely, in some embodiments, the structure of the positive electrode plate 223 is not limited to the examples. Referring to FIG. 12, FIG. 12 is a cross-sectional view of a positive electrode plate 223 of an electrode assembly 22 provided in some embodiments of this application and applied in some other embodiments. In the thickness direction Y of the porous current collector, the maximum thickness of the first region 22312a is less than the thickness of the second region 22312b. In addition, a surface, oriented away from the substrate 22311, of the first region 22312a is connected to a surface, oriented away from the substrate 22311, of the second region 22312b. To be specific, the surface, oriented away from the substrate 22311, of the first region 22312a is a bevel face; and the surface, oriented away from the substrate 22311, of the first region 22312a is at an acute angle to the surface, oriented away from the substrate 22311, of the second region 22312b, so as to form a notch on the surface, oriented away from the substrate 22311, of the positive active material layer 22312. The notch is configured to accommodate the insulation layer 224. The region in which the groove is formed on the positive active material layer 22312 is the first region 22312a.

It is hereby noted that the second region 22312b of the positive active material layer 22312 is connected to the first region 22312a at both ends in the first direction X. The structures of the two first regions 22312a may be the same or different. For example, in FIG. 10, of the first region 22312a formed at one end of the positive active material layer 22312 in the first direction X, the surface oriented away from the substrate 22311 is a flat face; and, of the first region 22312a formed at the other end of the positive active material layer, the surface oriented away from the substrate 22311 is a bevel face.

The thickness of the first region 22312a, coated with the insulation layer 224, of the positive active material layer 22312 is set to be less than the thickness of the second region 22312b of the positive active material layer 22312. The electrode assembly 22 of this structure increases the stability and reliability of the connection of the insulation layer 224 to the positive active material layer 22312, thereby reducing the risk of the insulation layer 224 falling off during use.

Figure 13:
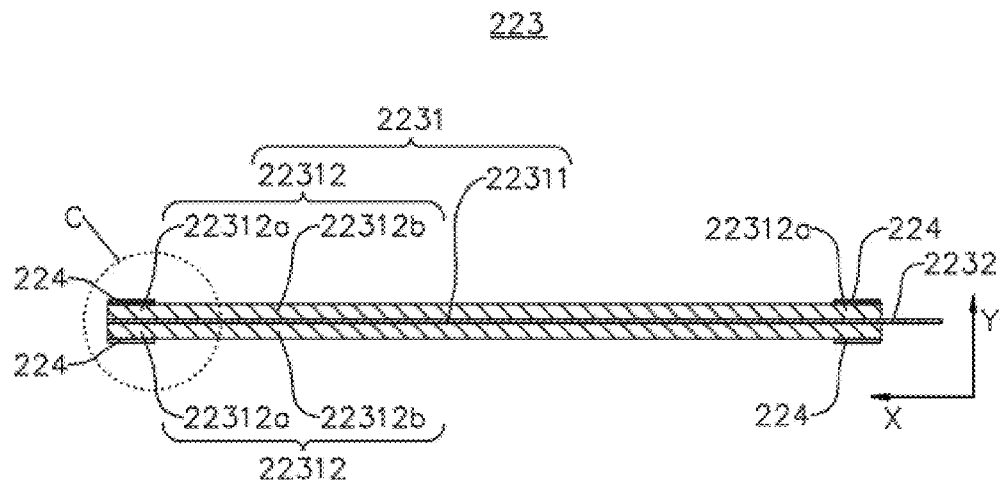
FIG. 13 is a cross-sectional view of a positive electrode plate of an electrode assembly provided in some embodiments of this application and applied in still some other embodiments.
Figure 14:
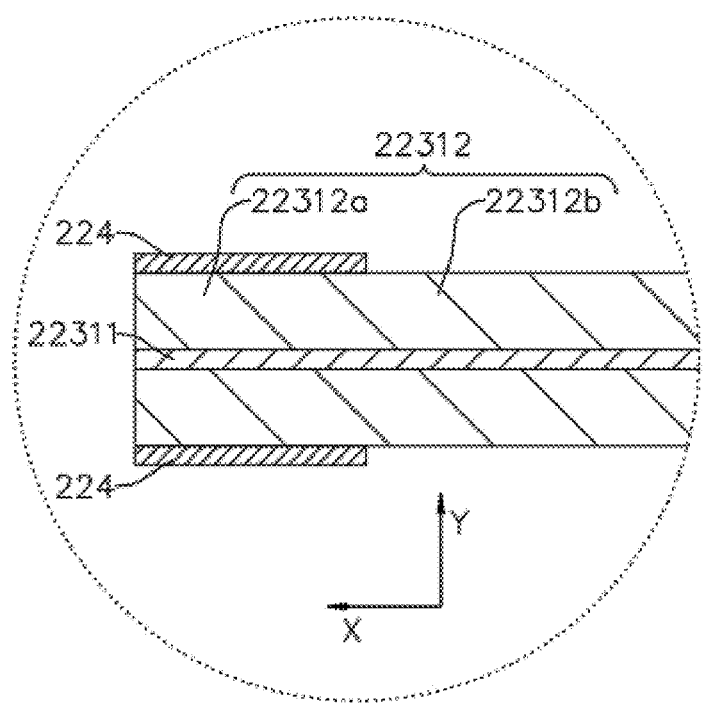
FIG. 14 is a close-up view of a part C of the positive electrode plate shown in FIG. 13.

According to some embodiments of this application, referring to FIG. 13 and FIG. 14, FIG. 13 is a cross-sectional view of a positive electrode plate 223 of an electrode assembly 22 provided in some embodiments of this application and applied in still some other embodiments. FIG. 14 is a close-up view of a part C of the positive electrode plate 223 shown in FIG. 13. The positive active material layer 22312 includes a first region 22312a and a second region

22312b. Along the first direction X, the first region 22312a is connected to at least one end of the second region 22312b. The insulation layer 224 covers the first region 22312a. Along the thickness direction Y of the porous current collector, a surface, oriented toward the porous current collector 2211, of the first region 22312a is flush with a surface, oriented toward the porous current collector 2211, of the second region 22312b.

That the surface, oriented toward the porous current collector 2211, of the first region 22312a is flush with the surface, oriented toward the porous current collector 2211, of the second region 22312b means: in the thickness direction Y of the porous current collector, the first region 22312a and the second region 22312b disposed on one side of the substrate 22311 are of the same thickness. In other words, of the positive active material layer 22312, the surface oriented toward the porous current collector in the thickness direction Y of the porous current collector 2211 is a flat face. In this embodiment, the region covered by the insulation layer 224 and located on the positive active material layer 22312 is the first region 22312a.

The surface oriented toward the porous current collector 2211 in the first region 22312a coated with the insulation layer 224 and located in the positive active material layer 22312 is set to be flush with the surface oriented toward the porous current collector 2211 in the second region 22312b of the positive active material layer 22312. In other words, of the positive active material layer 22312, the surface oriented toward the porous current collector 2211 in the thickness direction Y of the porous current collector is a flat face, and the insulation layer 224 is connected to the surface, oriented toward the porous current collector 2211, of the positive active material layer 22312, so as to cover the first region 22312a of the positive active material layer 22312. This structure makes it convenient to connect the insulation layer 224 to the positive active material layer 22312, reduces the difficulty of processing, and enhances the production efficiency.

Figure 15:
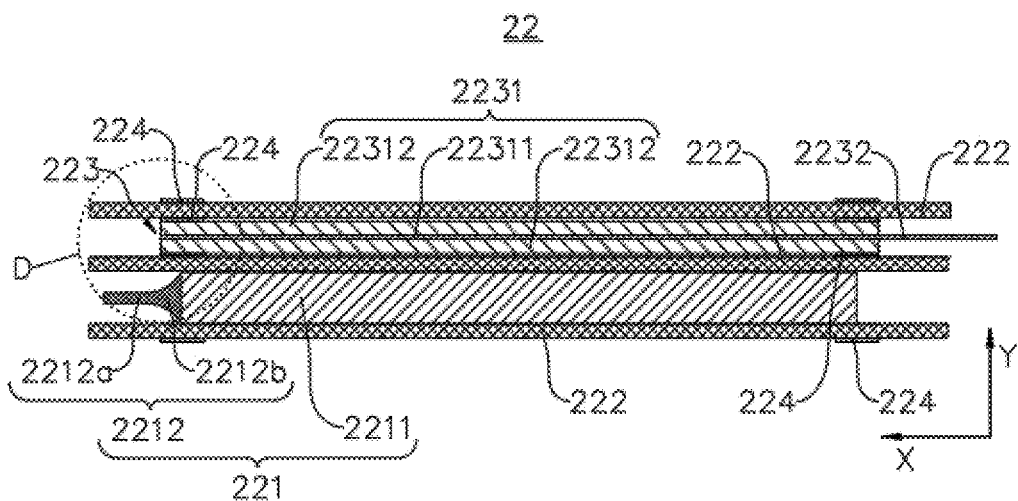
FIG. 15 is a partial cross-sectional view of an electrode assembly according to some other embodiments of this application.
Figure 16:
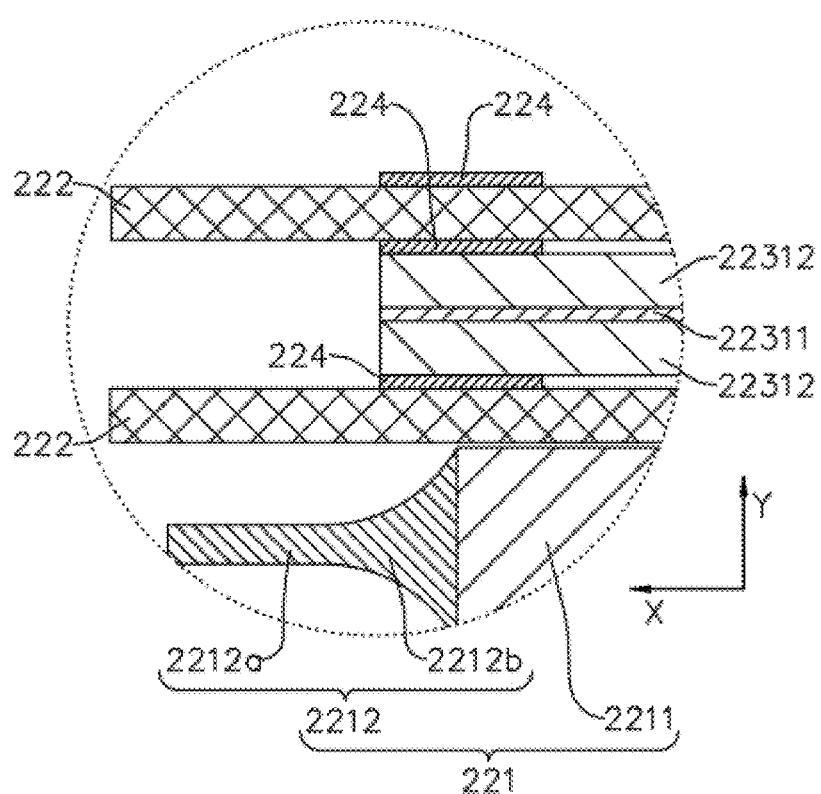
FIG. 16 is a close-up view of a part D of the electrode assembly shown in FIG. 15.

According to some embodiments of this application, referring to FIG. 15 and FIG. 16, FIG. 15 is a partial cross-sectional view of an electrode assembly 22 according to some other embodiments of this application, and FIG. 16 is a close-up view of a part D of the electrode assembly 22 shown in FIG. 15. The electrode assembly 22 may further include a separator 222. The separator 222 is disposed between the negative electrode plate 221 and the positive electrode plate 223 to separate the negative electrode plate 221 from the positive electrode plate 223. The insulation layer 224 is connected to a surface of the separator 222, the surface being oriented toward the positive active material layer 22312.

That the insulation layer 224 is connected to a surface of the separator 222, the surface being oriented toward the positive active material layer 22312, means: the insulation layer 224 is located between the separator 222 and the active material layer of the positive electrode plate 223 in the thickness direction Y of the porous current collector, and is connected to the separator 222, so as to enable the insulation layer 224 to cover one end of the positive active material layer 22312. In this embodiment, the second tab 2232 is a region in which the substrate 22311 extends beyond the positive active material layer 22312 in the first direction X.

As an example, the insulation layer 224 may be connected to the separator 222 by bonding, adsorption, or other means.

As an example, the separator may be made of a material such as polypropylene (PP) or polyethylene (PE).

A separator 222 is further disposed in the electrode assembly 22. The separator 222 serves to separate the positive electrode plate 223 from the negative electrode plate 221 to reduce the risk of a short circuit between the positive electrode plate 223 and the negative electrode plate 221. In addition, the insulation layer 224 is connected to a surface, oriented toward the positive active material layer 22312, of the separator 222, so that the insulation layer 224 covers one end of the positive active material layer 22312. This structure helps to reduce the difficulty of assembling the insulation layer 224.

According to some embodiments of this application, referring to FIG. 6, the body portion 2231 includes a substrate 22311 and a positive active material layer 22312. The second tab 2232 is connected to the substrate 22311. The positive active material layer 22312 is disposed on one side of the substrate 22311, where the side is oriented toward the porous current collector 2211 in the thickness direction Y of the porous current collector. Along the first direction X, neither end of the positive active material layer 22312 extends beyond the porous current collector 2211. Along the first direction X, at least one end of the positive active material layer 22312 is connected to an insulation layer 224, and the insulation layer 224 extends beyond one end of the porous current collector 2211.

The body portion 2231 includes a substrate 22311, a positive active material layer 22312, and an insulation layer 224. To be specific, the body portion 2231 includes the substrate 22311, the positive active material layer 22312, and the insulation layer 224, where the positive active material layer and the insulation layer are disposed on one side of the substrate 22311. The insulation layer 224 is connected to one end of the positive active material layer 22312 in the first direction X, so that the positive active material layer 22312 and the insulation layer 224 can work together to cover and squeeze the porous current collector 2211 of the negative electrode plate 221. In other words, the insulation layer 224 and the positive active material layer 22312 arranged in the first direction X are disposed on one side of the substrate 22311, the side being oriented toward the porous current collector 2211. In this embodiment, the second tab 2232 is a region in which the substrate 22311 extends beyond the insulation layer 224.

Along the first direction X, neither end of the positive active material layer 22312 extends beyond the porous current collector 2211. To be specific, in the first direction X, both ends of the porous current collector 2211 extend beyond the positive active material layer 22312; or, one end of the porous current collector 2211 extends beyond the positive active material layer 22312, and the other end of the porous current collector is flush with one end of the positive active material layer 22312; or, the two ends of the porous current collector 2211 are flush with the two ends of the positive active material layer 22312. As an example, in FIG. 6, both ends of the porous current collector 2211 in the first direction X extend beyond the positive active material layer 22312.

Along the first direction X, the insulation layer 224 extends beyond one end of the porous current collector 2211. To be specific, in the first direction X, the insulation layer 224 extends from one end near the positive active material layer 22312 along a direction away from the positive active material layer 22312, and extends beyond one end of the porous current collector 2211, so that a projection of the edge of the porous current collector 2211 in the thickness direction Y of the porous current collector lies within the insulation layer 224.

As an example, in FIG. 6, along the thickness direction Y of the porous current collector, the thickness of the insulation layer 224 is the same as the thickness of the positive active material layer 22312, so that the surface, oriented toward the porous current collector 2211, of the insulation layer 224, is flush with the surface, oriented toward the porous current collector 2211, of the positive active material layer 22312.

Neither end of the positive active material layer 22312 in the first direction X is set to extend beyond the porous current collector 2211. The insulation layer 224 is connected to at least one end of the positive active material layer 22312 in the first direction X, and the insulation layer 224 extends beyond one end of the porous current collector 2211 in the first direction X, so that the insulation layer 224 can apply a restraining force to the edge of the porous current collector 2211. The electrode assembly 22 of this structure ensures that the entire porous current collector 2211 is pressed by the body portion 2231, and also effectively reduces the lithium plating risk of the electrode assembly 22 in use.

In some embodiments, still referring to FIG. 6, along the first direction X, each of the two ends of the positive active material layer 22312 is connected to an insulation layer 224.

To be specific, both ends of the positive active material layer 22312 are connected to insulation layers 224, and the two insulation layers 224 extend beyond the two ends of the porous current collector 2211 respectively.

Each of the two ends of the positive active material layer 22312 along the first direction X is connected to an insulation layer 224, so that both insulation layers 224 can extend beyond the two ends of the porous current collector 2211 along the first direction X respectively, thereby applying a restraining force to both edges of the porous current collector 2211 in the first direction X, alleviating the phenomenon of forming dendrites from the lithium metal deposited at the edges of the porous current collector 2211, and in turn, effectively suppressing growth of the lithium metal dendrites, reducing the short circuit risk of the electrode assembly 22, and enhancing the safety and performance of the electrode assembly 22 in use.

According to some embodiments of this application, an elastic modulus of the insulation layer 224 is E, satisfying: E≥1 GPa. For the value of the elastic modulus of the insulation layer 224, reference may be made to the national standard, details of which are omitted here.

The elastic modulus of the insulation layer 224 is greater than or equal to 1 GPa, so that the insulation layer 224 is of high strength and toughness. On the one hand, this can effectively reduce the phenomenon of damage to the insulation layer 224 in use, and increase the service life of the electrode assembly 22. On the other hand, this can well block the lithium metal dendrites, and reduce the phenomena of the insulation layer 224 being pierced by the lithium metal dendrites, thereby effectively reducing the risk of the battery cell 20 in use.

In some embodiments, the insulation layer 224 is an insulation tape or an insulation coating layer.

If the insulation layer 224 is an insulation tape, the insulation layer 224 may be a blue tape, a green tape, or the like, and the insulation layer 224 is connected to the positive active material layer 22312 or the separator 222 by adhesion. If the insulation layer 224 is an insulation coating layer, the insulation layer 224 may be an epoxy resin insulation varnish, an alumina ceramics coating layer, or the like, and the insulation layer 224 is connected to the positive active material layer 22312 or the separator 222 by coating. The elastic modulus of the insulation layer is shown in the following table.

| Material | Blue tape | Green tape | Epoxy resin insulation varnish | Alumina ceramics coating layer |
|---|---|---|---|---|
| Elastic modulus (GPa) | ≥1 | ≥1 | ≥2 | ≥1 |

An insulation tape or an insulation coating layer is used as an insulation layer 224 to cover one end of the positive active material layer 22312 in the first direction X. To put the insulation layer 224 of this structure into use, the insulation layer 224 just needs to be bonded or applied onto one side of the positive active material layer 22312, and the side is oriented toward the porous current collector 2211, thereby facilitating assembling of the electrode assembly 22, and improving the production efficiency of the electrode assembly 22.

According to some embodiments of this application, referring to FIG. 5, FIG. 6, and FIG. 7, along the first direction X, at least one end of the body portion 2231 extends beyond the porous current collector 2211.

That at least one end of the body portion 2231 extends beyond the porous current collector 2211 means: one end of the body portion 2231 in the first direction X extends beyond the porous current collector 2211, and the other end of the body portion is flush with one end of the porous current collector 2211; or, both ends of the body portion 2231 in the first direction X extend beyond the porous current collector 2211.

As an example, in FIG. 5, FIG. 6, and FIG. 7, both ends of the body portion 2231 are structures extending beyond the porous current collector 2211.

At least one end of the body portion 2231 in the first direction X is set to extend beyond the porous current collector 2211 to ensure that the entire porous current collector 2211 is pressed by the body portion 2231. In this way, the porous current collector 2211 is well subjected to an expansion restraining force, thereby effectively alleviating the phenomenon of unrestrained growth of the lithium metal dendrites in the porous current collector 2211.

Figure 17:
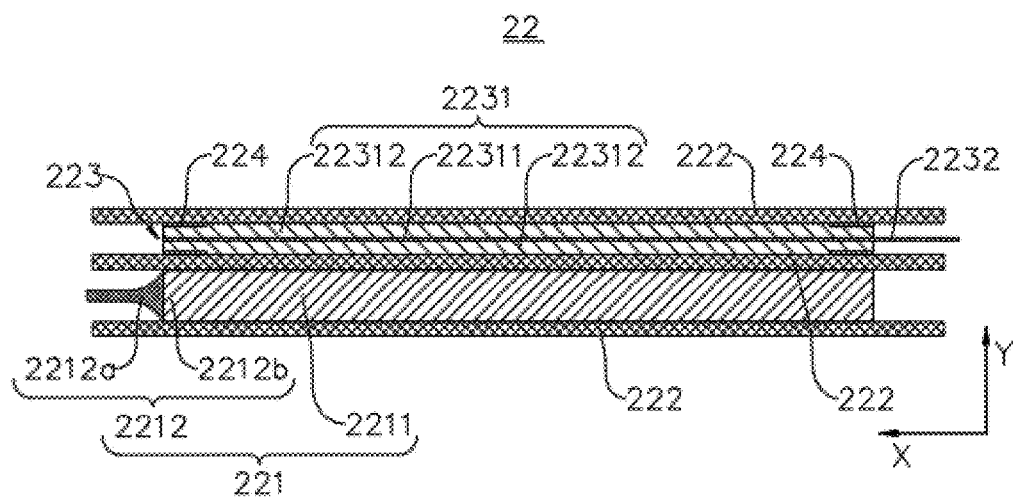
FIG. 17 is a partial cross-sectional view of an electrode assembly according to still some other embodiments of this application.

According to some embodiments of this application, referring to FIG. 17, FIG. 17 is a partial cross-sectional view of an electrode assembly 22 according to still some other embodiments of this application. Along the first direction X, two ends of the body portion 2231 are flush with two ends of the porous current collector 2211.

By setting the two ends of the body portion 2231 in the first direction X to be flush with the two ends of the porous current collector 2211, the electrode assembly 22 of this structure ensures that the entire porous current collector 2211 is pressed by the body portion 2231, and also effectively reduces the waste of the positive active material layer 22312, reduces the manufacturing cost of the electrode assembly 22, and saves the space occupied by the electrode assembly 22.

According to some embodiments of this application, referring to FIG. 5, along the thickness direction Y of the porous current collector, a maximum thickness of the first tab 2212 is less than a thickness of the porous current collector 2211.

That the maximum thickness of the first tab 2212 is less than the thickness of the porous current collector 2211 means: the thickness of the first tab 2212 at any position in the thickness direction Y of the porous current collector is less than the thickness of the porous current collector 2211.

The maximum thickness of the first tab 2212 in the thickness direction Y of the porous current collector is set to be less than the thickness of the porous current collector 2211. On the one hand, this setting makes it convenient to fit and connect the first tab 2212 to other components subsequently. On the other hand, during production of the electrode assembly 22, when neither end of the porous current collector 2211 of the negative electrode plate 221 in the first direction X is set to extend beyond the body portion 2231 of the positive electrode plate 223, it is convenient to efficiently distinguish the porous current collector 2211 from the first tab 2212, thereby improving the manufacturing precision of the electrode assembly 22.

According to some embodiments of this application, still referring to FIG. 5, the porous current collector 2211 and the first tab 2212 are a one-piece structure. The first tab 2212 is connected to one end of the porous current collector 2211 in the first direction X. The first tab 2212 includes a body section 2212a and a transition section 2212b. Along the first direction X, the transition section 2212b is connected between the body section 2212a and the porous current collector 2211. A thickness of the transition section 2212b in the thickness direction Y of the porous current collector increases gradually from an end near the body section 2212a to an end near the porous current collector 2211.

The first tab 2212 is a structure formed by calendering one end of the negative electrode plate 221 in the first direction X or by another process. In this way, a porous current collector 2211 and a relatively thin first tab 2212 are formed on the negative electrode plate 221, where the first tab protrudes beyond one end of the porous current collector 2211 in the first direction X. In other words, this structure makes the first tab 2212 include a body section 2212a and a transition section 2212b connected between the body section 2212a and the porous current collector 2211. The body section 2212a is configured to be connected to a negative electrode terminal. In this embodiment, it is sufficient that a part of the negative electrode plate 221, which is not compressed by calendering (that is, the porous current collector 2211), is set not to extend beyond the body portion 2231 of the positive electrode plate 223.

The porous current collector 2211 and the first tab 2212 are a structure formed in one piece, so that the first tab 2212 includes a body section 2212a and a transition section 2212b connected between the porous current collector 2211 and the body section 2212a. The thickness of the transition section 2212b in the thickness direction Y of the porous current collector increases gradually from the end near the body section 2212a to the end near the porous current collector 2211, thereby making the first tab 2212 protrude beyond one end of the porous current collector 2211. The negative electrode plate 221 of this structure can effectively increase the structural strength of the first tab 2212, and effectively increase the connection strength between the first tab 2212 and the porous current collector 2211.

Figure 18:
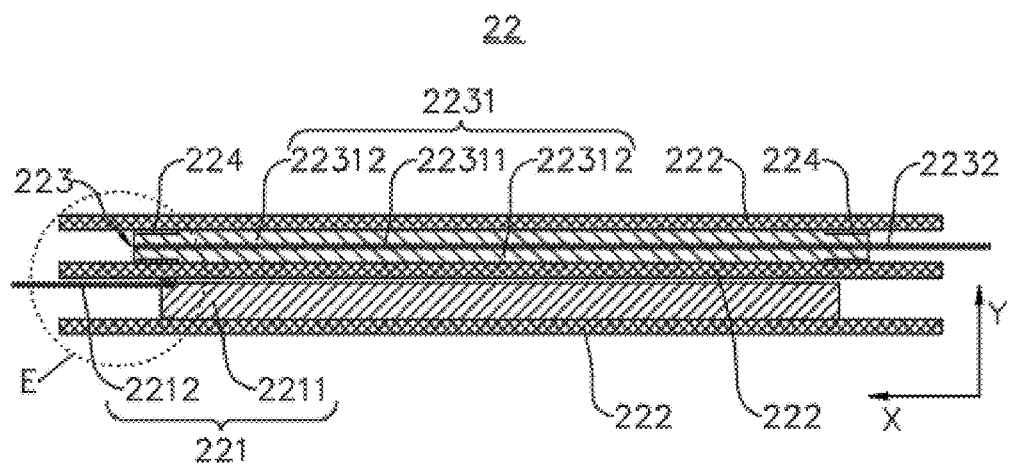
FIG. 18 is a partial cross-sectional view of an electrode assembly according to yet some other embodiments of this application.
Figure 19:
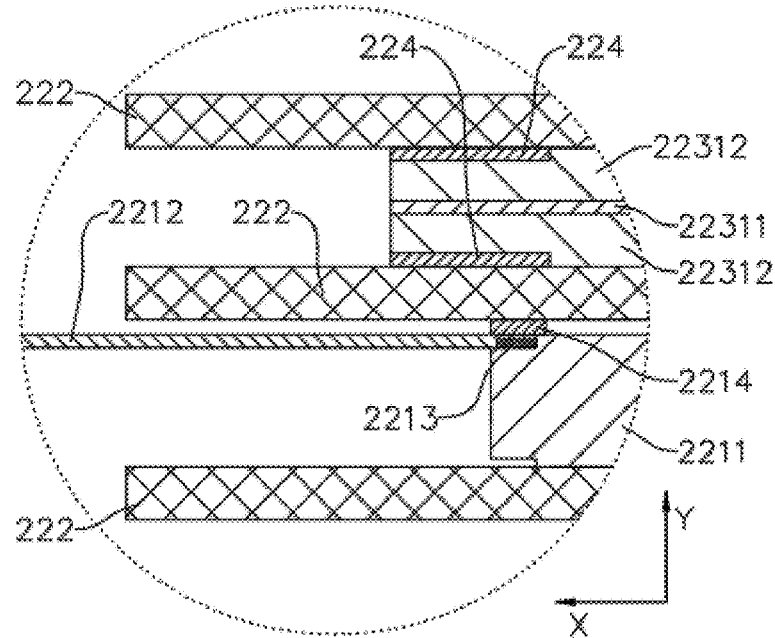
FIG. 19 is a close-up view of a part E of the electrode assembly shown in FIG. 18.

According to some embodiments of this application, referring to FIG. 18 and FIG. 19, FIG. 18 is a partial cross-sectional view of an electrode assembly 22 according to still some other embodiments of this application, and FIG. 19 is a close-up view of a part E of the electrode assembly 22 shown in FIG. 18. The porous current collector 2211 and the first tab 2212 are separate structures. The first tab 2212 is connected to one side of the porous current collector 2211 in the thickness direction Y of the porous current collector. The first tab 2212 protrudes beyond one end of the porous current collector 2211 along the first direction X.

That the porous current collector 2211 and the first tab 2212 are separate structures means: the first tab 2212 and the porous current collector 2211 are stand-alone components, and the first tab 2212 is connected to one side of the porous current collector 2211 in the thickness direction Y of the porous current collector, and extends beyond one end of the porous current collector 2211 along the first direction X. In this embodiment, the first tab 2212 and the porous current collector 2211 overlap in a region in the thickness direction Y of the porous current collector, so that it is sufficient to set the porous current collector 2211 not to extend beyond the body portion 2231 of the positive electrode plate 223 in the first direction X.

As an example, the first tab 2212 is welded to the porous current collector 2211, and a weld mark 2213 is formed.

Definitely, in some embodiments, referring to FIG. 19, in a case that the first tab 2212 is welded to the porous current collector 2211, a protection adhesive 2214 may be further disposed on the negative electrode plate 221. The protection adhesive 2214 is disposed on one side of the weld mark 2213 in the thickness direction Y of the porous current collector and covers the weld mark 2213, where the side is oriented toward the separator 222. It is hereby noted that in some other embodiments, the protection adhesive 2214 does not need to be disposed on the weld mark 2213 of the negative electrode plate 221.

As an example, the protection adhesive 2214 may be made of rubber, plastic, silicone, or the like.

The porous current collector 2211 and the first tab 2212 are made as separate structures, and the first tab 2212 is connected to one side of the porous current collector 2211 in the thickness direction Y of the porous current collector, and then protrudes beyond one end of the porous current collector 2211 along the first direction X, so that the first tab 2212 protrudes beyond one end of the porous current collector 2211. The negative electrode plate 221 of this structure is easy to manufacture, thereby improving the production efficiency of the electrode assembly 22.

According to some embodiments of this application, referring to FIG. 5, along the thickness direction Y of the porous current collector, the thickness of the second tab 2232 is less than the thickness of the body portion 2231.

The second tab 2232 and the substrate 22311 may be a one-piece structure or separate structures. That the second tab 2232 and the substrate 22311 are a one-piece structure means: the second tab 2232 is a region by which the substrate 22311 extends beyond the positive active material layer 22312 and the insulation layer 224 in the first direction X. If the second tab 2232 and the substrate 22311 are separate structures, the second tab 2232 may be connected to one end of the substrate 22311 in the first direction X by welding or other means, so as to enable the second tab 2232 to protrude beyond one end of the body portion 2231 in the first direction X. As an example, in FIG. 5, the second tab 2232 and the substrate 22311 are a one-piece structure.

The thickness of the second tab 2232 in the thickness direction Y of the porous current collector is set to be less than the thickness of the body portion 2231. On the one hand, this setting makes it convenient to fit and connect the second tab 2232 to other components subsequently. On the other hand, during production of the electrode assembly 22, when neither end of the porous current collector 2211 of the negative electrode plate 221 in the first direction X is set to extend beyond the body portion 2231 of the positive electrode plate 223, it is convenient to efficiently distinguish the body portion 2231 from the second tab 2232, thereby improving the manufacturing precision of the electrode assembly 22.

According to some embodiments of this application, referring to FIG. 4 and FIG. 5, the electrode assembly 22 is a jelly-roll electrode assembly 22. The first direction X is identical to a direction of a winding axis of the electrode assembly 22.

The electrode assembly 22 of a jelly-roll structure makes the first direction X be an extension direction of the winding axis of the electrode assembly 22. That is, the plane in which the winding direction of the electrode assembly 22 is located is perpendicular to the first direction X. The jelly-roll structure also makes the thickness direction Y of the porous current collector be a radial direction of the electrode assembly 22.

The electrode assembly 22 is made to be a jelly-roll structure, and the first direction X is identical to the direction of the winding axis of the electrode assembly 22. The electrode assembly 22 of this structure is easy to manufacture on the one hand, and reduces the phenomena of misalignment of the positive electrode plate 223 and the negative electrode plate 221. On the other hand, by just setting neither end of the porous current collector 2211 of the negative electrode plate 221 in the first direction X to extend beyond the positive active material layer 22312 of the positive electrode plate 223, the entire porous current collector 2211 is ensured to be pressed by the body portion 2231, thereby effectively suppressing the growth of lithium metal dendrites on the porous current collector 2211.

According to some embodiments of this application, the porous current collector 2211 is made of a foamed metal.

As an example, the porous current collector 2211 is made of foamed copper. Definitely, in other embodiments, the porous current collector 2211 may be made of foamed nickel or the like instead. The foamed copper used as a material of the porous current collector 2211 endows the porous current collector 2211 with high electrical conductivity, thereby reducing the internal resistance of the electrode assembly 22 containing such a negative electrode plate 221, and enhancing the performance of the battery cell 20 in use.

The porous current collector 2211 made of a foamed metal makes the porous current collector 2211 capable of directly reacting with lithium ions, so as to implement input or output of electrical energy of the negative electrode plate 221. The porous current collector 2211 of this structure enables the lithium ions to deposit inside the porous current collector 2211, thereby reducing the risk of lithium metal deposition on the surface of the porous current collector 2211.

In some embodiments, referring to FIG. 3 and FIG. 4, the electrode assembly 22 is a cylindrical structure.

The center axis of the electrode assembly 22 of the cylindrical structure extends along the first direction X.

The electrode assembly 22 assumes a cylindrical structure. The electrode assembly 22 of a cylindrical structure generates a smaller expansion force during use, so as to be applicable to the porous current collector 2211 made of a foamed metal.

According to some embodiments of this application, this application further provides a battery cell 20. The battery cell 20 includes a shell 21 and the electrode assembly 22 disclosed in any one of the above technical solutions. The electrode assembly 22 is accommodated in the shell 21.

According to some embodiments of this application, this application further provides a battery 100. The battery 100 includes the battery cell 20 disclosed in any one of the above technical solutions.

According to some embodiments of this application, this application further provides an electrical device. The electrical device includes the battery cell 20 disclosed in any one of the above technical solutions, and the battery cell 20 is configured to provide electrical energy for the electrical device.

The electrical device may be any device or system in which the battery cell 20 is applied.

According to some embodiments of this application, referring to FIG. 3 to FIG. 5 and FIG. 8 to FIG. 9, this application provides an electrode assembly 22. The electrode assembly 22 includes a negative electrode plate 221, a positive electrode plate 223, and a separator 222. The separator 222 is disposed between the negative electrode plate 221 and the positive electrode plate 223 to separate the negative electrode plate 221 from the positive electrode plate 223. The negative electrode plate 221 includes a porous current collector 2211 and a first tab 2212 connected to one end of the porous current collector 2211 along the first direction X. The first tab 2212 and the porous current collector 2211 are a one-piece structure. The first tab 2212 includes a body section 2212a and a transition section 2212b. Along the first direction X, the transition section 2212b is connected between the body section 2212a and the porous current collector 2211. A thickness of the transition section 2212b in the thickness direction Y of the porous current collector increases gradually from an end near the body section 2212a to an end near the porous current collector 2211. The positive electrode plate 223 includes a body portion 2231 and a second tab 2232 connected to one end of the body portion 2231 along a first direction X. The body portion 2231 and the porous current collector 2211 are stacked along a thickness direction Y of the porous current collector. Along the first direction X, both ends of the body portion 2231 extend beyond the porous current collector 2211. The first direction X is perpendicular to the thickness direction Y of the porous current collector. The body portion 2231 includes a substrate 22311 and a positive active material layer 22312 applied to both sides of the substrate 22311 along the thickness direction Y of the porous current collector. Two insulation layers 224 are disposed on one side of the positive active material layer 22312, the side being oriented toward the porous current collector 2211. The two insulation layers 224 cover two ends of the positive active material layer 22312 in the first direction X respectively. The second tab 2232 and the substrate 22311 are a one-piece structure. The second tab 2232 is a region in which the substrate 22311 extends beyond the positive active material layer 22312 and the insulation layer 224 in the first direction X. The positive active material layer 22312 includes a first region 22312a and a second region 22312b. Along the first direction X, both ends of the second region 22312b are connected to a first region 22312a. The two insulation layers 224 cover the two first regions 22312a respectively. Along the first direction X, the second region 22312b does not extend beyond the porous current collector 2211. The insulation layer 224 is connected to the first region 22312a of the positive active material layer 22312. The thickness of the first region 22312a is less than the thickness of the second region 22312b. Along the thickness direction Y of the porous current collector, a part of the insulation layer 224 overlaps the porous current collector 2211. A width of the overlap part between the insulation layer 224 and the porous current collector 2211 in the first direction X is L, satisfying: 1 mm≤L≤3.5 mm. Along the thickness direction Y of the porous current collector, a sum of thicknesses of the first region 22312a and the insulation layer 224 at the same position is $D_2$, and a thickness of the second region 22312b is $D_3$, satisfying: $-80\ \mu m \le D_2-D_3 \le 10\ \mu m$.

It is hereby noted that to the extent that no conflict occurs, the embodiments of this application and the features in the embodiments may be combined with each other.

What is described above is merely exemplary embodiments of this application, but is not intended to limit this application. To a person skilled in the art, various modifications and variations may be made to this application. Any and all modifications, equivalent replacements, improvements, and the like made without departing from the spirit and principles of this application still fall within the protection scope of this application.

What is claimed is:

1. An electrode assembly, comprising:
   a negative electrode plate, comprising a porous current collector and a first tab connected to at least one end of the porous current collector; and
   a positive electrode plate, comprising a body portion and a second tab connected to at least one end of the body portion, wherein the body portion and the porous current collector are stacked along a thickness direction of the porous current collector, and, along a first direction, neither end of the porous current collector extends beyond the body portion, and the first direction is perpendicular to the thickness direction of the porous current collector;
   wherein the body portion comprises:
   a substrate;
   a positive active material layer, disposed on one side of the substrate, wherein the side is oriented toward the porous current collector in the thickness direction of the porous current collector, and, along the first direction, neither end of the porous current collector extends beyond the positive active material layer; and
   an insulation layer is disposed on one side of the positive active material layer, the side is oriented toward the porous current collector, and the insulation layer covers one end of the positive active material layer;
   wherein two insulation layers are disposed on one side of the positive active material layer, the side is oriented toward the porous current collector, and the two insulation layers cover two ends of the positive active material layer respectively.

2. The electrode assembly according to claim 1, wherein the body portion further comprises:
   wherein the second tab is connected to the substrate.

3. The electrode assembly according to claim 2, wherein the positive active material layer comprises a first region and a second region, and, along the first direction, the first region is connected to at least one end of the second region; and
   the insulation layer covers the first region, and, along the first direction, the second region does not extend beyond the porous current collector.

4. The electrode assembly according to claim 2, wherein, along the first direction, the insulation layer extends beyond one end of the positive active material layer; and/or
   along the thickness direction of the porous current collector, a part of the insulation layer overlaps the porous current collector, and a width of the overlap part between the insulation layer and the porous current collector in the first direction is L, satisfying: 1 mm≤L≤3.5 mm.

5. The electrode assembly according to claim 2, wherein the insulation layer is connected to the positive active material layer.

6. The electrode assembly according to claim 5, wherein the positive active material layer comprises a first region and a second region, and, along the first direction, the first region is connected to at least one end of the second region;
   the insulation layer covers the first region, and, along the thickness direction of the porous current collector, a sum of thicknesses of the first region and the insulation layer at a same position is $D_2$, and a thickness of the second region is $D_3$, satisfying: $-80\ \mu m \le D_2-D_3 \le 10\ \mu m$; and/or
   the insulation layer covers the first region, and a thickness of the first region is less than a thickness of the second region; and/or
   the insulation layer covers the first region, and, along the thickness direction of the porous current collector, a surface, oriented toward the porous current collector, of the first region is flush with a surface, oriented toward the porous current collector, of the second region.

7. The electrode assembly according to claim 2, wherein the electrode assembly further comprises:
   a separator, disposed between the negative electrode plate and the positive electrode plate to separate the negative electrode plate from the positive electrode plate, wherein
   the insulation layer is connected to a surface of the separator, the surface being oriented toward the positive active material layer.

8. The electrode assembly according to claim 1, wherein the body portion comprises:
   a substrate, wherein the second tab is connected to the substrate; and
   a positive active material layer, disposed on one side of the substrate, wherein the side is oriented toward the porous current collector in the thickness direction of the porous current collector, and, along the first direction, neither end of the positive active material layer extends beyond the porous current collector; and
   along the first direction, at least one end of the positive active material layer is connected to an insulation layer, and the insulation layer extends beyond one end of the porous current collector.

9. The electrode assembly according to claim 8, wherein, along the first direction, each of two ends of the positive active material layer is connected to the insulation layer.

10. The electrode assembly according to claim 2, wherein an elastic modulus of the insulation layer is E, satisfying: $E \ge 1$ GPa.

11. The electrode assembly according to claim 2, wherein the insulation layer is an insulation tape or an insulation coating layer.

12. The electrode assembly according to claim 1, wherein, along the first direction, at least one end of the body portion extends beyond the porous current collector.

13. The electrode assembly according to claim 1, wherein, along the first direction, two ends of the body portion are flush with two ends of the porous current collector.

14. The electrode assembly according to claim 1, wherein, along the thickness direction of the porous current collector, a maximum thickness of the first tab is less than a thickness of the porous current collector.

15. The electrode assembly according to claim 14, wherein the porous current collector and the first tab are a one-piece structure, and the first tab is connected to one end of the porous current collector in the first direction; and the first tab comprises a body section and a transition section, wherein, along the first direction, the transition section is connected between the body section and the porous current collector, and a thickness of the transition section in the thickness direction of the porous current collector increases gradually from an end near the body section to an end near the porous current collector.

16. The electrode assembly according to claim 14, wherein the porous current collector and the first tab are separate structures, the first tab is connected to one side of the porous current collector in the thickness direction of the porous current collector, and the first tab protrudes beyond one end of the porous current collector along the first direction.

17. The electrode assembly according to claim 1, wherein, along the thickness direction of the porous current collector, a thickness of the second tab is less than a thickness of the body portion.

18. The electrode assembly according to claim 1, wherein the electrode assembly is a jelly-roll electrode assembly, and the first direction is identical to a direction of a winding axis of the electrode assembly.

19. A battery cell, comprising:
a shell; and
the electrode assembly according to claim 1, wherein the electrode assembly is accommodated in the shell.

* * * * *